(12) United States Patent
Ohtsubo et al.

(10) Patent No.: US 7,556,307 B2
(45) Date of Patent: Jul. 7, 2009

(54) AUTOMOBILE MOVABLE FLOOR APPARATUS

(75) Inventors: Tomonori Ohtsubo, Fuchu-cho (JP); Hiroki Uemura, Fuchu-cho (JP); Toshimine Morino, Fuchu-cho (JP); Kazuhiro Matsuhashi, Fuchu-cho (JP); Keisuke Iida, Fuchu-cho (JP); Yukio Iwayama, Fuchu-cho (JP); Eiji Yoshimura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 205 days.

(21) Appl. No.: 11/700,948

(22) Filed: Feb. 1, 2007

(65) Prior Publication Data

US 2007/0176456 A1    Aug. 2, 2007

(30) Foreign Application Priority Data

| Feb. 2, 2006 | (JP) | ............................. 2006-026054 |
| Feb. 3, 2006 | (JP) | ............................. 2006-027516 |
| Feb. 3, 2006 | (JP) | ............................. 2006-027517 |
| Feb. 3, 2006 | (JP) | ............................. 2006-027518 |
| Feb. 14, 2006 | (JP) | ............................. 2006-037015 |

(51) Int. Cl.
   *B60N 3/06* (2006.01)
   *B62J 25/00* (2006.01)
   *G05G 1/18* (2006.01)

(52) U.S. Cl. ........................ 296/75; 180/326; 296/97.23

(58) Field of Classification Search ................... 74/560; 180/326, 330; 296/75, 97.23, 208
   See application file for complete search history.

(56) References Cited

U.S. PATENT DOCUMENTS 2,793,149 A * 5/1957 Richter ........................ 428/80

(Continued)

FOREIGN PATENT DOCUMENTS

EP    410939 A1 * 1/1991

(Continued)

OTHER PUBLICATIONS

European Search Report Application No. EP 07 10 1458 dated Sep. 4, 2007.

*Primary Examiner*—Glenn Dayoan
*Assistant Examiner*—Paul A Chenevert
(74) *Attorney, Agent, or Firm*—Studebaker & Brackett PC; Donald R. Studebaker

(57) ABSTRACT

A floor board positioned in the foot area of an occupant seated in an occupant seat is allowed to be driven up or down. In an automobile movable floor apparatus, a floor board 5 that covers the upper face of an automobile body floor 3 and a raising-lowering drive mechanism 6 that drives the floor board 5 to be raised or lowered are provided in the foot area of an occupant seated in an occupant seat 4, and a toe board portion 8 sloping down to the rear and a floor base portion 9 that extends toward the rear of the automobile body and is continuous with the rear end of the toe board portion 8 are provided in the automobile body floor 3. The floor board 5 includes a toe board corresponding portion 18 that corresponds to the toe board portion 8 of the automobile body floor 3, and a floor base corresponding portion 19 that corresponds to the floor base portion 9, and the toe board corresponding portion 18 and the floor base corresponding portion 19 are formed in a flattened V-like shape when viewed from the side.

16 Claims, 13 Drawing Sheets

U.S. PATENT DOCUMENTS

| | | | | |
|---|---|---|---|---|
| 2,810,672 A * | 10/1957 | Taylor | ........................ | 428/138 |
| 2,862,761 A * | 12/1958 | Scheidegger | ................. | 296/75 |
| 3,047,088 A * | 7/1962 | Murrell | ..................... | 180/90.6 |
| 3,059,960 A * | 10/1962 | Komorowski et al. | ......... | 296/64 |
| 3,082,032 A * | 3/1963 | Stata | ........................ | 296/97.23 |
| 3,149,875 A * | 9/1964 | Stata | ........................ | 296/97.23 |
| 3,288,239 A * | 11/1966 | Ristau | ........................ | 180/78 |
| 3,312,498 A * | 4/1967 | Stata | ........................ | 296/97.23 |
| 3,337,258 A * | 8/1967 | Steinberg | ................. | 296/97.23 |
| 3,357,717 A * | 12/1967 | Samford | ..................... | 280/775 |
| 3,362,316 A * | 1/1968 | Froitzheim et al. | ........... | 454/144 |
| 3,401,975 A * | 9/1968 | Oger | ........................ | 296/97.23 |
| 3,691,868 A * | 9/1972 | Smith | ........................ | 74/512 |
| 4,361,610 A * | 11/1982 | Roth | ........................ | 428/95 |
| 4,392,546 A * | 7/1983 | Brown et al. | ................. | 180/326 |
| 4,481,240 A * | 11/1984 | Roth | ........................ | 428/95 |
| 4,673,603 A * | 6/1987 | Roth | ........................ | 428/85 |
| 4,898,419 A * | 2/1990 | Kenmochi et al. | .......... | 296/204 |
| 4,955,658 A * | 9/1990 | Graves | ........................ | 296/75 |
| 4,984,838 A * | 1/1991 | Kim | ........................ | 296/75 |
| 5,183,308 A * | 2/1993 | Koga et al. | .................... | 296/75 |
| 6,224,133 B1 * | 5/2001 | Abramoski et al. | ........... | 296/75 |
| 6,318,785 B1 * | 11/2001 | Tousignant | .................. | 296/75 |
| 6,450,530 B1 * | 9/2002 | Frasher et al. | ............. | 280/735 |
| 6,474,728 B1 * | 11/2002 | Mendis et al. | ............... | 296/204 |
| 6,547,301 B1 * | 4/2003 | Keller | ....................... | 296/39.3 |
| 6,571,662 B1 * | 6/2003 | Mendis | ....................... | 74/514 |
| 6,614,344 B1 * | 9/2003 | Frasher et al. | ........... | 340/425.5 |
| 6,634,669 B2 * | 10/2003 | Levine | ....................... | 280/735 |
| 7,055,893 B2 * | 6/2006 | Yamamura et al. | ..... | 296/187.08 |
| 7,364,186 B2 * | 4/2008 | Levine | ....................... | 280/731 |
| 7,419,029 B2 * | 9/2008 | Ohtsubo et al. | ............ | 180/326 |
| 7,437,229 B2 * | 10/2008 | Ohtsubo et al. | ............ | 701/49 |
| 2005/0109555 A1 | 5/2005 | Ohtsubo | | |
| 2007/0205626 A1 * | 9/2007 | Ohtsubo et al. | ............... | 296/75 |
| 2008/0047771 A1 * | 2/2008 | Ujimoto et al. | ............ | 180/326 |

FOREIGN PATENT DOCUMENTS

| | | | |
|---|---|---|---|
| EP | 1 533 190 B1 | | 7/2006 |
| FR | 2631292 A1 | * | 11/1989 |
| FR | 2 689 081 | | 10/1993 |
| FR | 2689081 A1 | * | 10/1993 |
| GB | 2 400 350 | | 10/2004 |
| JP | 59034944 A | * | 2/1984 |
| JP | 61016141 A | * | 1/1986 |
| JP | 63 034254 | | 2/1988 |
| JP | 01172040 A | * | 7/1989 |
| JP | 2005-145405 | | 6/2005 |
| JP | 2005-271829 | | 10/2005 |
| JP | 2006-001387 | | 1/2006 |
| JP | 2006-001388 | | 1/2006 |
| JP | 2006 001388 | | 1/2006 |
| WO | WO 9308040 A1 | * | 4/1993 |

\* cited by examiner

FIG.11
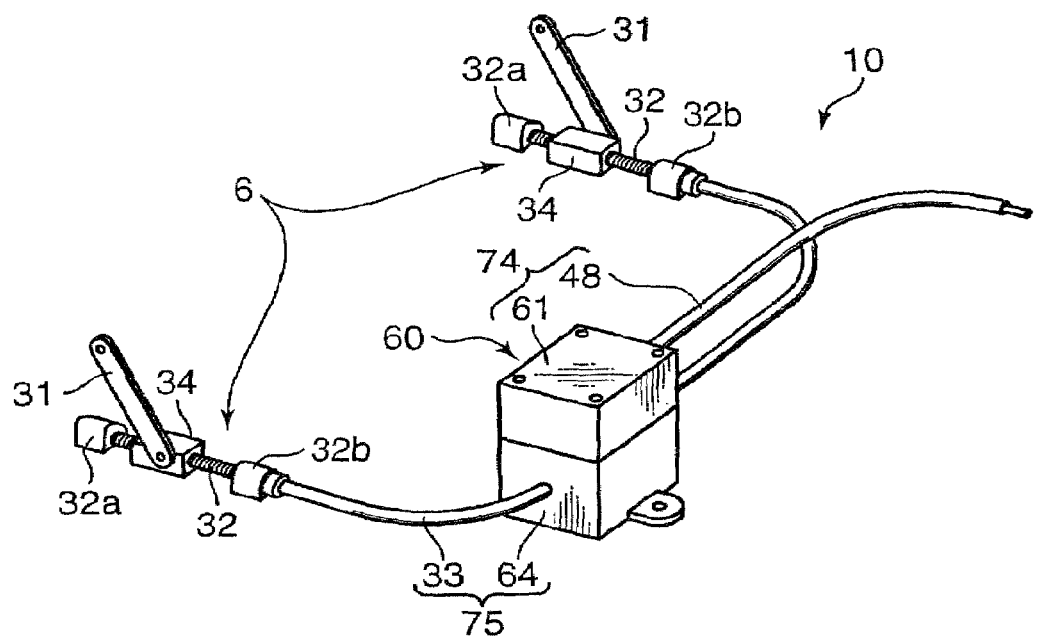
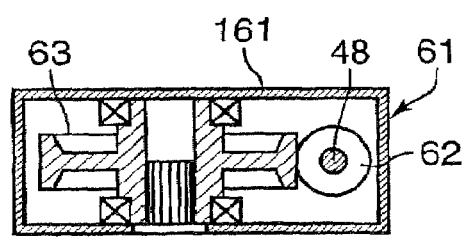
FIG.12
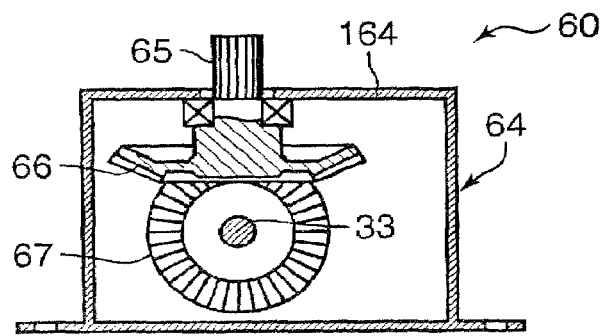

AUTOMOBILE MOVABLE FLOOR APPARATUS

BACKGROUND OF THE INVENTION

1. Field of the Invention

The present invention relates to an automobile movable floor apparatus in which a floor board that covers the upper face of the automobile floor in the foot area of an occupant seated in an occupant seat is provided such that the floor board can move up or down.

2. Description of the Background Art

In the background art, as disclosed for example in JP Utility Model Publication Ser. No. Sho (1988) 63-69655, a movable floor apparatus is disclosed that is provided with a fixed floor portion that extends in the front-to-rear direction of the automobile, a movable floor portion constituted from a flat plate material that is disposed in an area located below a foot pedal such as a brake pedal above the fixed floor portion, and a raising-lowering drive mechanism that drives the movable floor portion up or down relative to the fixed floor portion.

As disclosed in above JP UM Pub Sho 63-69655, by displacing the movable floor portion up or down according to the physique or the like of the occupant, it is possible to improve the operability of the foot pedal. However, because the position at which the occupant's foot is placed in the movable floor portion, made from flat plate material as described above, changes within a wide range, it is necessary for the installation surface area of the movable floor portion to be sufficiently large, corresponding to this wide range. When a large installation surface area is adopted for the movable floor in this manner, it is difficult to allow the front portion of the movable floor portion to follow the fixed floor portion when raising or lowering the movable floor portion, and if the fixed floor portion is not positioned far enough downward, it may not be possible to lower the movable floor portion to an appropriate position.

SUMMARY OF THE INVENTION

Therefore, with the foregoing in mind, it is an object of the present invention to provide an automobile movable floor apparatus in which it is possible to drive a floor board, positioned in the foot area of an occupant seated in an occupant seat, up or down appropriately.

In order to attain this object, the present invention provides an automobile movable floor apparatus including a floor board that covers the upper face of an automobile body floor and a raising-lowering drive mechanism that raises or lowers the floor board, provided in the foot area of an occupant seated in an occupant seat, and a toe board portion sloping down to the rear and a floor base portion that extends toward the rear of the automobile body and is continuous with the rear end of the toe board portion, provided in the automobile body floor, the floor board including a toe board corresponding portion that corresponds to the toe board portion of the automobile body floor, and a floor base corresponding portion that corresponds to the floor base portion, the toe board corresponding portion and the floor base corresponding portion being formed in a flattened V-like shape when viewed from the side.

BRIEF DESCRIPTION OF THE DRAWINGS

FIG. 11 is a perspective view that shows a specific configuration of a driving force transmission mechanism in the movable floor apparatus in FIG. 1.

FIG. 12 is a cross-sectional view that shows a specific configuration of a driving force transmission mechanism in the movable floor apparatus in FIG. 1.

DESCRIPTION OF THE PREFERRED EMBODIMENTS

First Embodiment

Figure 1:
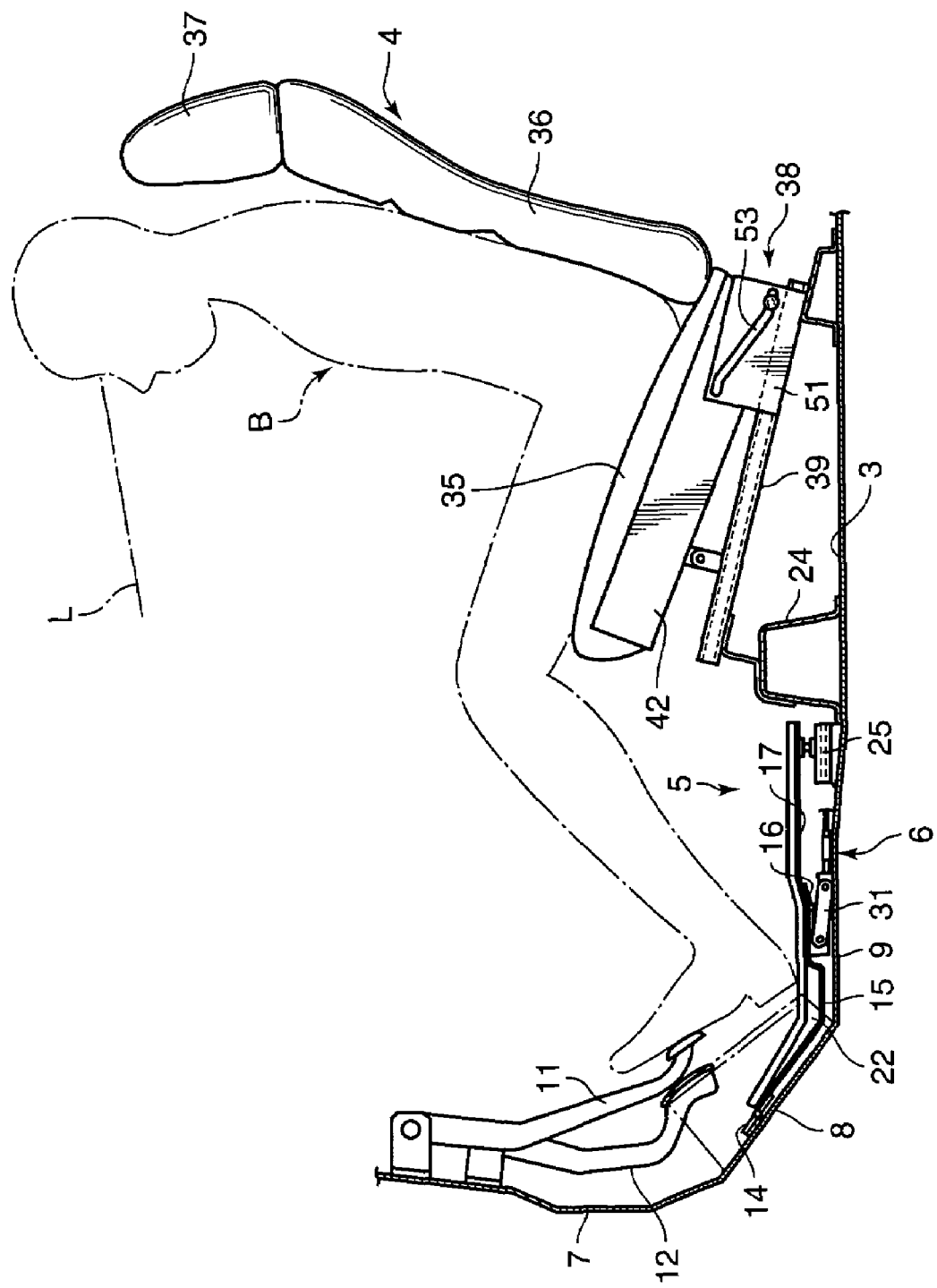
FIG. 1 is a side cross-sectional view that shows the overall configuration of an automobile movable floor apparatus according to a first embodiment of the present invention.
Figure 2:
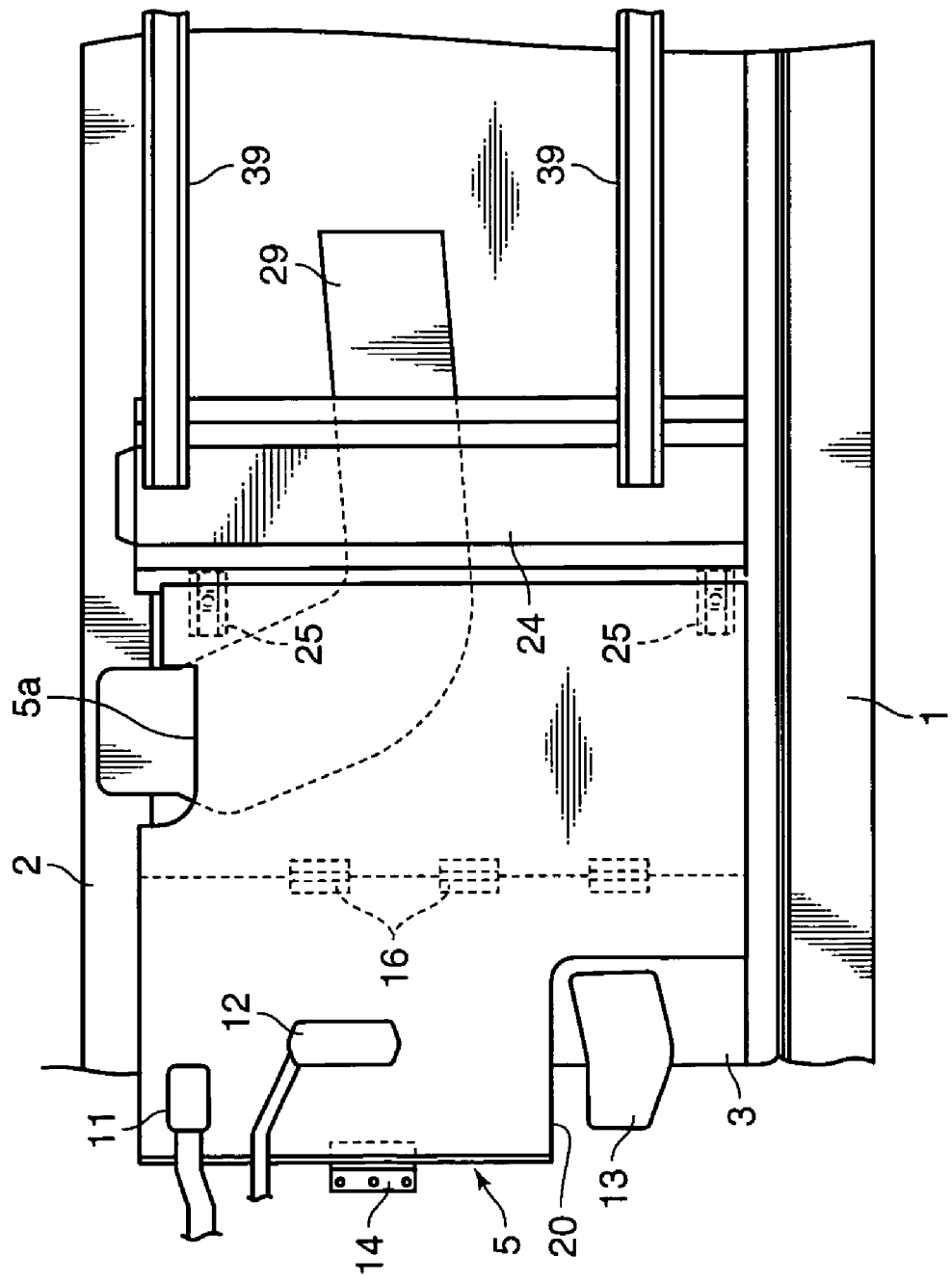
FIG. 2 is a plan view that shows the configuration of relevant portions of the movable floor apparatus in FIG. 1.
Figure 3:
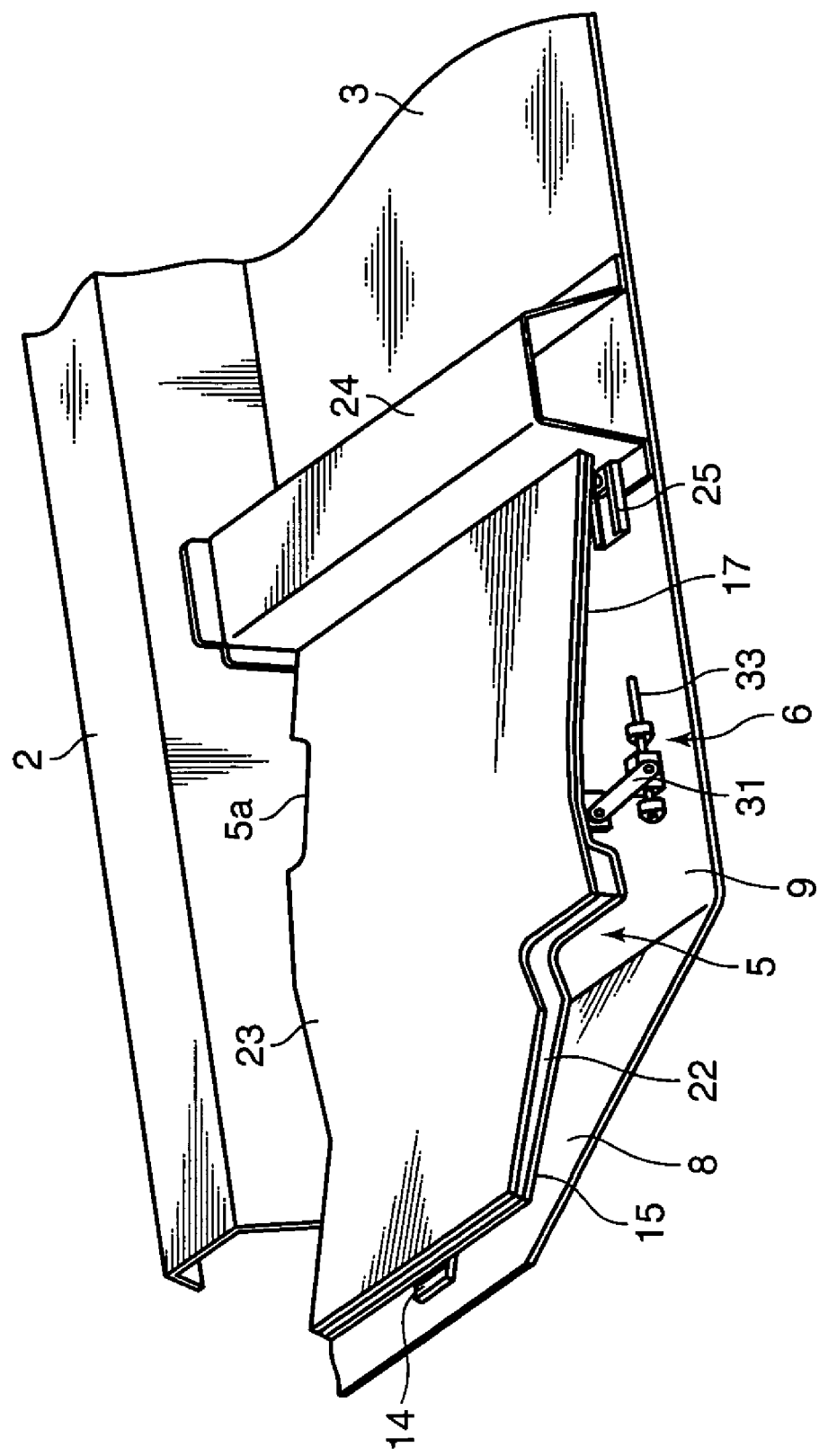
FIG. 3 is a perspective view that shows the configuration of relevant portions of the movable floor apparatus in FIG. 1.

FIGS. 1 to 3 show a first embodiment of an automobile movable floor apparatus according to the present invention. This movable floor apparatus includes a side sill 1 provided extending in the front-rear direction in both left and right side portions of the automobile body, a floor tunnel 2 provided extending in the front-rear direction in the central portion in the lateral direction of the automobile body, an automobile body floor 3 provided between the floor tunnel 2 and the side sill 1, and a floor board 5 that covers the upper face of the automobile body floor 3 in the foot area of an occupant seated in an occupant seat 4 constituted from a driver's seat or the like. Below the floor board 5, a raising-lowering drive mechanism 6 is disposed that drives the floor board 5 up or down relative to the automobile floor 3.

The automobile body floor 3 includes a toe board portion 8 that extends in the rearward direction of the automobile body in a state sloping down and rearward from the bottom end of a dash panel 7, and a floor base portion 9 that is approximately flat and extends in the rearward direction of the automobile body continuous with the rear end of the toe board portion 8.

Above the toe board portion 8, foot pedals constituting for example an accelerator pedal 11 and a brake pedal 12 operated by the driver are provided, and a foot rest 13 is provided to the side of those foot pedals. Also, provided on the upper face of the automobile body floor 3 is an unshown automobile body floor mat constituted from, for example, pile material and backing.

Figure 4:
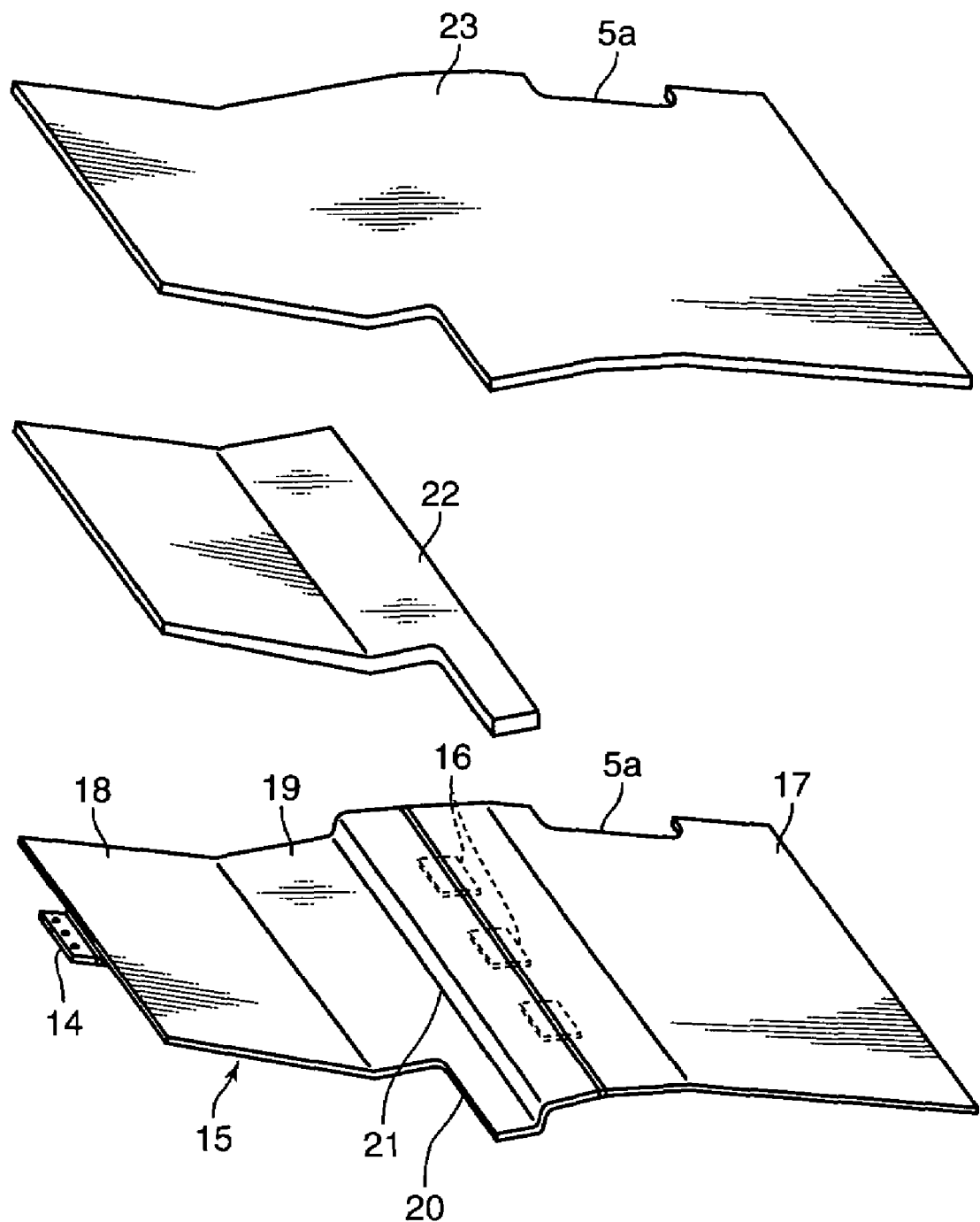
FIG. 4 is an exploded perspective view that shows a specific configuration of a floor board in the movable floor apparatus in FIG. 1.
Figure 5:
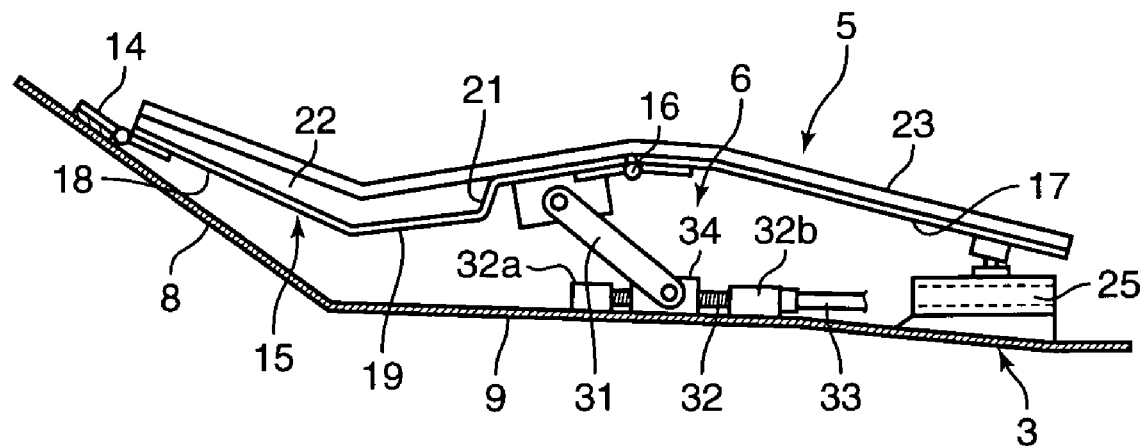
FIG. 5 is a side cross-sectional view that shows the configuration of relevant portions of the movable floor apparatus in FIG. 1.

As shown in FIGS. 4 and 5, the floor board 5 includes a front side board 15 whose front end is pivotably supported by a hinge member 14 at the toe board portion 8 of the automobile body floor 3, and a rear side board 17 that is connected to the rear end of the front side board 15 such that the rear side board 17 can bend via hinge members 16. The front side board 15 includes a toe board corresponding portion 18 that slopes up and frontward in the same manner as the toe board portion 8 of the automobile body floor 3, and a floor base corresponding portion 19 that extends in the rearward direction of the automobile body continuous with the rear end of the toe board corresponding portion 18. These are formed in a flattened V-like shape when viewed from the side. Where the term "flattened V-like shape" is meant a shape formed by two lines forming an upwardly open angle not as shallow as a shape of an ordinary letter "V" but not as flat as a horizontal line. The front portion of the front side board 15, i.e. the toe board-corresponding portion 18, is provided such that it extends out below the foot pedals constituting for example the accelerator pedal 11 and the brake pedal 12, and provided in the side portion of the toe board-corresponding portion 18 is an avoiding portion 20 that is notched so as to avoid obstructing the foot rest 13.

Also, a concave portion 21 that is concave downward except in its rear portion and is formed in the front side board 15, and in the concave portion 21, by disposing and bonding an impact-absorbing member 22 constituted from an elastic body of, for example, urethane foam material or synthetic rubber material, the impact-absorbing member 22 is disposed such that it covers the upper face of the floor board 5 across the toe board-corresponding portion 18 and the floor base-corresponding portion 19 of the front side board 15. By setting the width dimension of the impact-absorbing member 22 to approximately the same value as the width dimension of the floor board 5, the impact-absorbing member 22 is disposed throughout approximately the entire area of the floor board 5 in the widthwise direction of the automobile, and by setting the thickness of the impact-absorbing member to about the same as the amount of concavity of the concave portion 21, the upper face of the impact-absorbing member 22 is set to about the same height as the upper face of the floor board 5 continuous with the concave portion 21, specifically, about the same height as the rear portion of the front side board 15.

On the upper face of the floor board 5 is provided one floor board mat 23 constituted from, for example, pile material and backing. The floor board mat 23 is formed with a size that can continuously cover the upper face of the impact-absorbing member 22 disposed in the concave portion 21, and the upper face of the floor board 5 continuous with the upper face of the impact-absorbing member 22, i.e., the rear portion of the toe board-corresponding portion 18 and the rear side board 17. In a side portion of the floor board 5 and the floor board mat 23, a cut-out 5a is formed in order to avoid interfering with a rear heat duct 29 described below.

The width dimension of the rear side board 17 of the floor board 5 is set that the rear side board 17 covers approximately the entire area between the side sill 1 and the floor tunnel 2 disposed at positions corresponding to the floor base portion 9 of the automobile body floor 3. Also, to the rear of the area where the floor board 5 is provided, the occupant seat 4 constituted from a driver's seat or the like is provided, and below the front edge of the occupant seat 4, a cross member 24 is disposed that connects the floor tunnel 2 and the side sill 1. On the frontward side of the cross member 24, a pair of left and right guide rails 25 are disposed that slidably support the rear portion of the rear side board 17.

Figure 6:
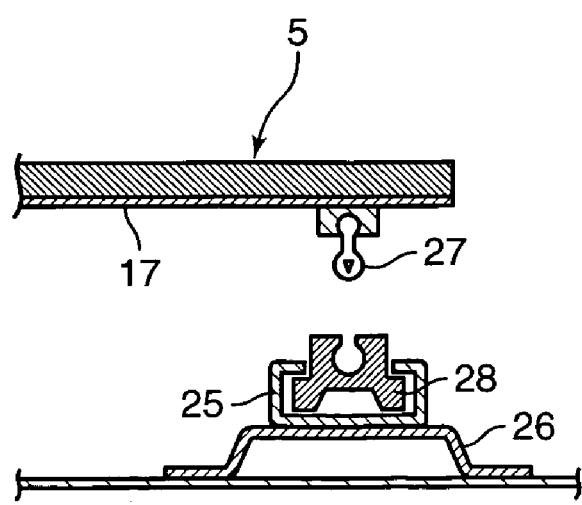
FIG. 6 is a front cross-sectional view that shows a support structure of a rear portion of the floor board in FIG. 4.

As shown in FIGS. 5 and 6, a guide rail 25 is constituted from a body with a U-shape in cross-section, installed on the automobile body floor 3 via a bracket 26, and are configured such that a grommet 27 provided protruding from the lower face of the rear of the rear side board 17 holds a slider 28 such that the slider 28 can be engaged or released. According to raising-lowering displacement of the floor board 5, described below, the slider 28 can be displaced by sliding along the guide rails 25, and thus, in a state with the rear of the rear side board 17 supported by the guide rails 25, the slider 28 can move to the front or to the rear.

Figure 7:
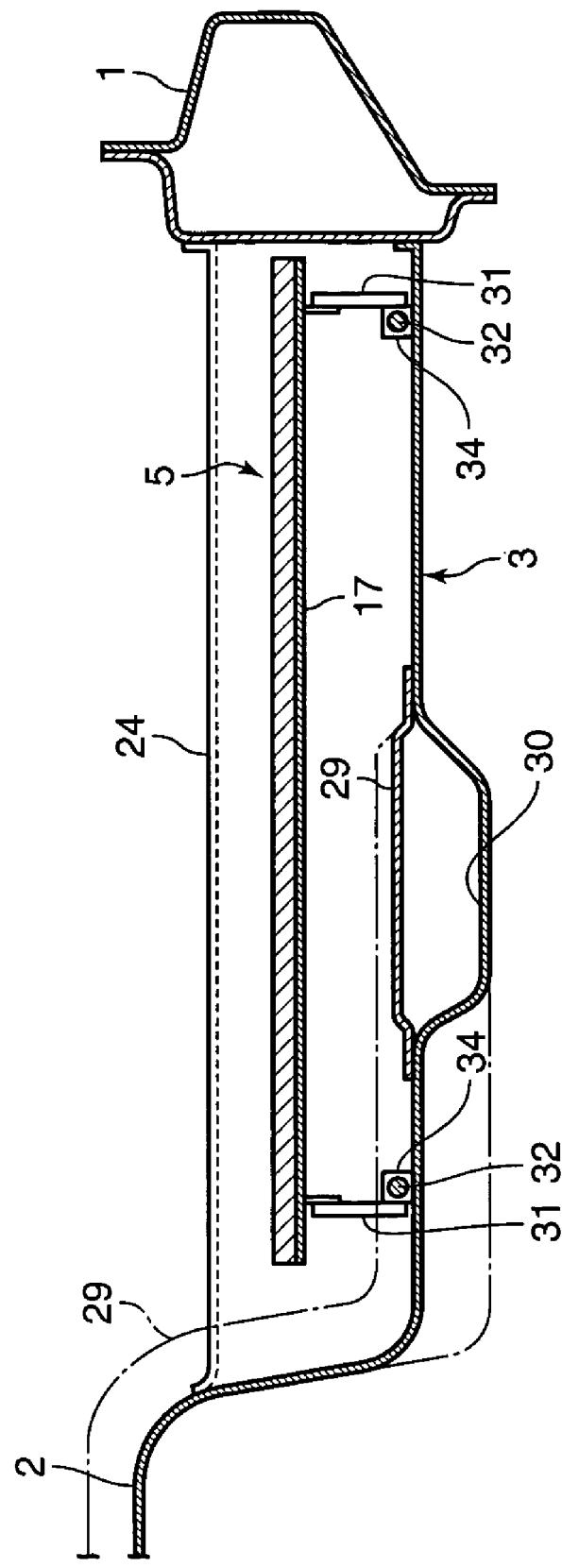
FIG. 7 is a front-cross-sectional view that shows the configuration of the floor board in FIG. 4 and members peripheral to that floor board.

Also, as shown in FIGS. 2 and 7, in the automobile body floor 3, a rear heat duct 29 is disposed that extends toward the rear of the automobile body from the side of the floor tunnel 2 through an area below the rear side board 17. The rear heat duct 29 is provided so as to guide heating air, which has been led out from a heater duct (not shown) disposed inside an instrument panel, from the upper face of the floor tunnel 2 along the side face to below the rear side board 17, and then to the rear of the automobile body. Further, in the automobile body floor 3, a concave groove portion 30 is formed that extends below the cross member 24 toward the rear of the automobile body, and a conducting path for the heating air is formed by the concave groove portion 30 and the rear heat duct 29.

As shown in FIGS. 5, 7, and 11, the raising-lowering drive mechanism 6 that raises or lowers the floor board 5 includes a pair of left and right drive links 31 whose tip end is pivotably supported by the lower face of the rear end of the front end board 15, a pair of left and right screw shafts 32 whose front and rear ends are rotatably supported on the upper face of the automobile body floor 3 via bearing members 32a and 32b, and slide blocks 34 threadedly attached to the screw shafts 32 and supported such that the slide blocks can slide along the upper face of the automobile body floor 3. The base end of the drive links 31 is pivotably supported by the side face of the slide blocks 34.

The rear end of the screw shafts 32 of the raising-lowering drive mechanism 6 is connected to an output cable 33 of a driving force transmission mechanism 10 (FIG. 11) described below, and the screw shafts 32 are configured so that they are rotationally driven with the shafts turning according to the rotational force of the output cable 33. The screw shafts 32 are driven in the normal direction to screw the slide blocks 34 along the shafts 32 toward the front of the automobile body, so that the rear end of the drive links 31 is pushed forward, and the front end of the drive links is pushed upward. As a result, the drive links 31 are moved from a lying state to a standing state, and due to the rear portion of the front side board 15 being pushed upward via the drive links 31, the front side board 15 is displaced by swinging from a lowered position shown in FIG. 1 to a raised position shown in FIG. 5, with the hinge member 14 as the fulcrum.

On the other hand, the front portion of the rear side board 17 of the floor board 5 is connected to the rear end of the front side board 15 by the hinge members 16, so the front portion of the rear side board 17 is pushed upward corresponding to the rising operation of the front side board 15, and while the rear end of the rear side board 17 is supported by the automobile body floor 3 with the guide rails 25, the rear side board 17 moves toward the front of the automobile body. Thus, the connecting portion of the front side board 15 and the rear side board 17 rises, and the floor board 5 moves to a state folded up at the connecting portion like a mountain when viewed from the side.

Also, as shown in FIGS. 2 and 7, in the automobile body floor 3, a rear heat duct 29 is disposed that extends toward the rear of the automobile body from the side of the floor tunnel 2 through an area below the rear side board 17. The rear heat duct 29 is provided so as to guide heating air, which has been led out from a heater duct (not shown) disposed inside an instrument panel, from the upper face of the floor tunnel 2 along the side face to below the rear side board 17, and then to the rear of the automobile body. Further, in the automobile body floor 3, a concave groove portion 30 is formed that extends below the cross member 24 toward the rear of the automobile body, and a conducting path for the heating air is formed by the concave groove portion 30 and the rear heat duct 29.

The occupant seat 4 is a separate-type seat separately provided on the driver's side and the passenger's side of the front of the automobile cabin, and as shown in FIG. 1, includes a seat cushion 35 that constitutes the occupant's seating face, a seat back 36 standing upward from the rear end of the seat cushion 35, and a head rest 37 installed in the top end of the seat back 36. With a seat position adjustment mechanism 38 provided in the automobile body floor 3, the occupant seat 4 is supported such that it is possible to adjust the front-rear position and the vertical position of the seat cushion 35, and the angle at which the seat cushion 35 is disposed relative to the automobile floor 3.

Figure 8:
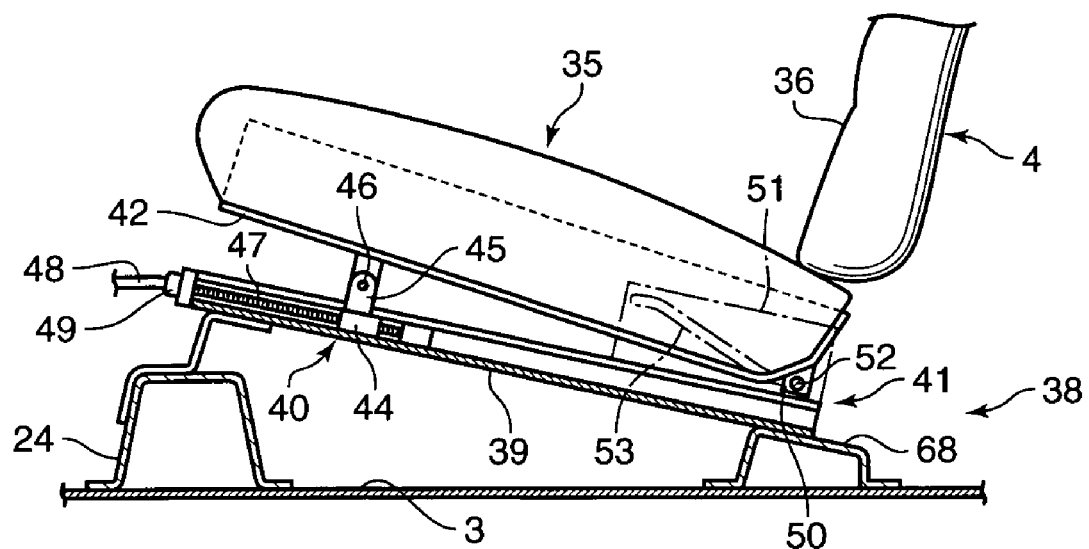
FIG. 8 is a side cross-sectional view that shows the structure of a seat position adjustment mechanism in the movable floor apparatus in FIG. 1.
Figure 9:
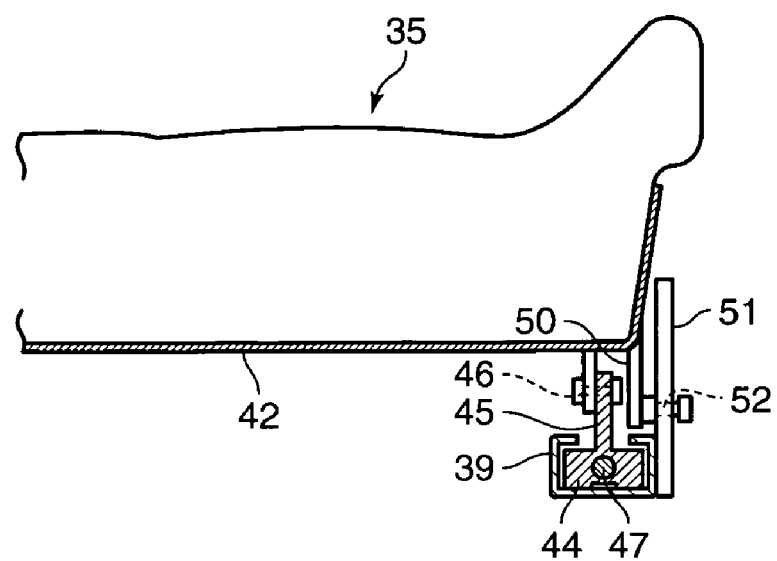
FIG. 9 is a front cross-sectional view that shows the structure of a seat position adjustment mechanism in the movable floor apparatus in FIG. 1.

As shown in FIGS. 8 and 9, the seat position adjustment mechanism 38 includes a pair of left and right guide rails 39 that are provided on the automobile body floor 3 in a state sloping upward to the front, a slide driving means 40 that displaces the seat cushion 35 along the guide rails 39 by sliding the seat cushion 35 to the front or rear of the automobile body, and a tilting means 41 that raises or lowers the rear end of the seat cushion 35 in conjunction with the front-rear movement of the seat cushion 35.

The seat cushion 35 includes a cushion frame 42 disposed so as to cover the main body (the cushion material) of the seat cushion 35 from below, and below the cushion frame 42, the guide rails 39 are provided constituted from a member with the cross-sectional shape of a U whose upper face is open. A slider 44, in which a protrusion 45 is provided protruding from the upper face of the slider 44, is slidably disposed within the guide rails 39, and the upper end of the protrusion 45 is pivotably supported by the bottom of the cushion frame 42 via a coupling pin 46. Also, a screw hole into which a screw shaft 47 of the slide driving means 40 is screwed is formed in the slider 44.

The screw shafts 47 of the slide driving means 40 are disposed within the guide rails 39, and both the front and rear end of the guide rails 39 are rotatably supported by a bearing member. In addition, the rear end of the guide rails 39 is connected to a drive motor (drive source) via an unshown power transmission cable. Drive power is transmitted from the drive motor via the power transmission cable to the screw shaft 47, thus rotationally driving the screw shaft 47, and thus the slider 44 is screwed along the guide rails 39. Also, an input cable 48 of the driving force transmission mechanism 10 (FIG. 11) described below is connected to the front end of the screw shaft 47 via a coupling 49.

The tilting means 41 of the seat position adjustment mechanism 38 includes a support plate 50 provided protruding below the rear of the cushion frame 42, a guide plate 51 provided fixed to the side face of the guide rails 25 and erected in the perpendicular direction, and a guide pin 52 providing protruding from the support plate 50. A guide groove 53 having a sloping portion sloping upward and to the front is formed in the guide plate 51, and the guide pin 52 is supported so as to be able to slide along the guide groove 53. The slider 44 is screwed by the screw shaft 47 of the slide driving means 40 so that the front portion of the seat cushion 35 moves frontward or backward along the guide rails 39, and due to the guide pin 52 sliding along the guide groove 53 of the guide plate 51 according to that frontward or backward movement, the rear portion of the seat cushion 35 is driven up or down.

Figure 10:
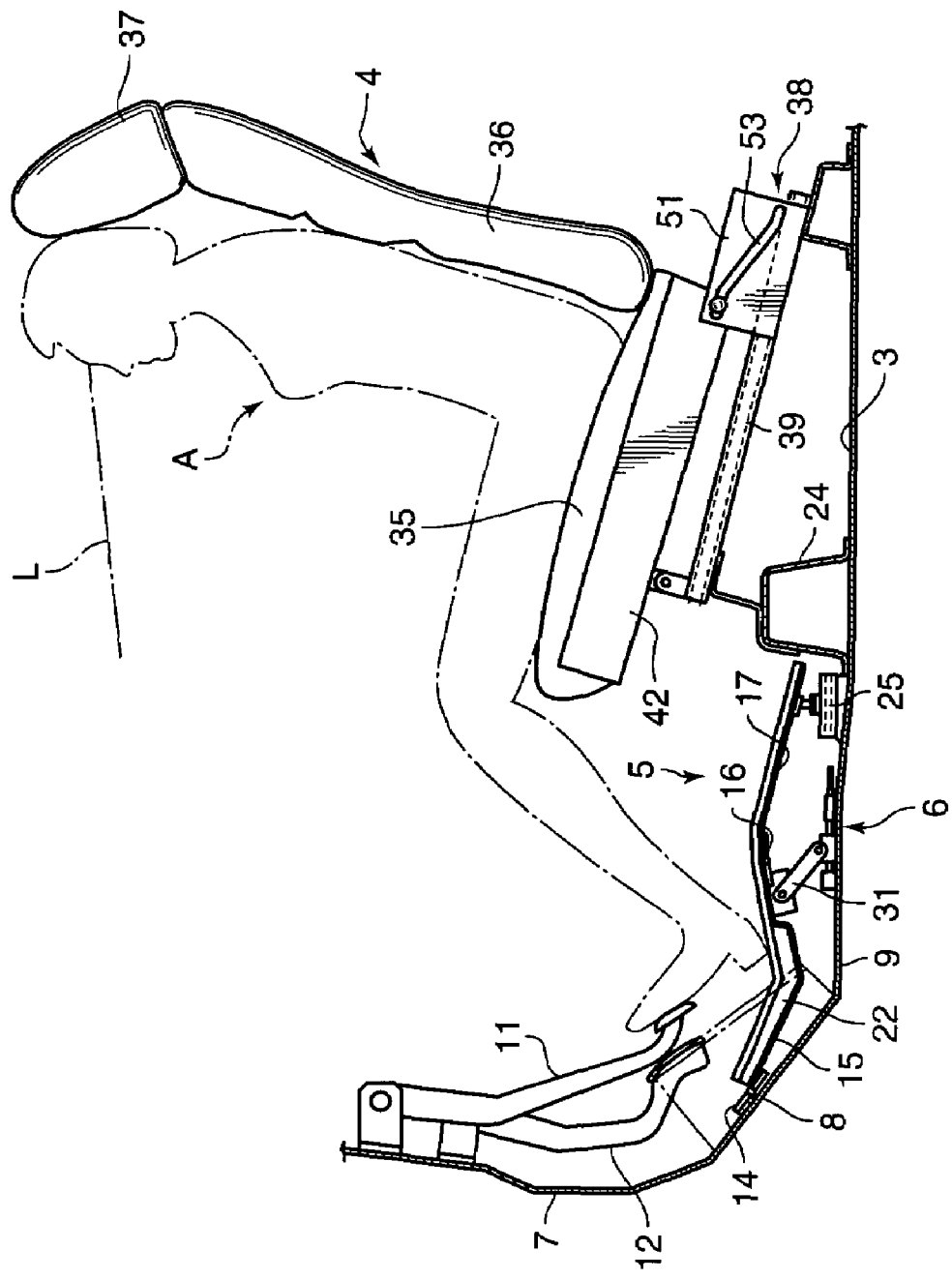
FIG. 10 is a side cross-sectional view that shows a state in which the floor board in FIG. 4 has been displaced to an elevated position.

When, for example, the seat cushion 35 is slidably displaced by the slide driving means 40 from the rear position shown in FIGS. 1 and 8 to the front position shown in FIG. 10, the front portion of the seat cushion 35 is slidably displaced along the guide rails 39 and gradually rises, and the guide pin 52 slides along the guide groove 53 of the guide plate 51 toward the front of the automobile body. Thus, the rear end of the seat cushion 35 is pushed upward so that the seat cushion 35 is slidably displaced. As a result, according to the frontward movement of the seat cushion 35, the slope angle of the seat cushion 35 relative to the horizontal plane gradually becomes smaller so that the seat cushion 35 becomes disposed near the horizontal plane, and correspondingly the seat back 36 is moved from a state in which it is tilted rearward to a state in which it is nearly upright.

When a short occupant A sits in the occupant seat 4, when the occupant seat 4 is slid frontward in the automobile body by operating an unshown operating switch to operate the drive motor of the slide driving means 40, the front portion of the seat cushion 35 rises along the guide rails 39 as shown in FIG. 10, and the rear portion of the seat cushion 35 is pushed upward, so a hip point, which indicates the seating center of the occupant relative to the seat cushion 35, moves up and toward the front corresponding to the height of occupant A's body, and thus the line of sight of occupant A matches a proper line L. Also, the rear end of the seat cushion 35 is pushed upward according to the frontward movement of the occupant seat 4 so that the angle at which the seat cushion 35 is disposed is near horizontal. Thus, because the short occupant A, whose legs are short in accordance with occupant A's height, sits in a state with their knees significantly bent and the portion of the legs beneath the knees falling at a predetermined angle, a state in which occupant A's feet are separated from the floor is prevented.

On the other hand, as shown in FIG. 1, when a tall occupant B sits in the occupant seat 4, when the occupant seat 4 is slid backward in the automobile body by the slide driving means 40, the front portion of the seat cushion 35 is lowered along the guide rails 39, and the rear portion of the seat cushion 35 is pushed downward, so the hip point indicating the seating center of occupant B relative to the seat cushion 35 moves down and to the rear corresponding to the height of occupant B's body, and thus the line of sight of occupant B matches the proper line L. Also, the seat cushion 35 is tilted up and to the front according to the rearward movement of the occupant seat 4, so that the knees of the tall occupant B, whose legs are long in accordance with occupant B's height, are bent at a reduced angle so the portion of the legs beneath the knees is extended to the front, and therefore the occupant B can obtain a stable sitting posture.

The slide driving means 40 of the seat position adjustment mechanism 38 and the raising-lowering drive mechanism 6 of the floor board 5 are connected by the driving force transmission mechanism 10 shown in FIG. 11. The driving force transmission mechanism 10 transmits the driving force of the slide driving means 40 to the raising-lowering drive mechanism 6, and due to such transmission of driving force via the driving force transmission mechanism 10, in conjunction with the occupant seat 4 driven in the front-rear direction by the slide driving means 40, the floor board 5 is driven up or down by the raising-lowering drive mechanism 6.

The driving force transmission mechanism 10 is configured from the input cable 48 connected to the screw shaft 47 of the slide driving means 40, the output cable 33 connected to the screw shafts 32 of the raising-lowering drive mechanism 6, and a gear box 60 that connects the input cable 48 and the output cable 33 such that they can be moved in conjunction with each other.

The input cable 48 is such that within a flexible cylindrical body a cable material capable of transmitting rotational force is held rotationally around a shaft, and transmits rotational force input from the slide driving means 40 of the seat position adjustment mechanism 38 to the gear box 60. Also, the output cable 33 has the same structure as the input cable 48, and transmits the rotational force that has been input from the input cable 48 via the gear box 60 to the screw shafts 32 of the raising-lowering drive mechanism 6.

As shown in FIGS. 11 and 12, the gear box 60 is configured from a deceleration gear box 61 that reduces the rotation speed of the input cable 48, and a transmission gear box 64 that transmits the decelerated driving force to the output cable 33. The deceleration gear box 61 and the transmission gear box 64 are detachably connected, and in that place the driving force transmission mechanism 10 is divided into two parts. That is, the driving force transmission mechanism 10 is configured from an input portion 74 including the deceleration gear box 61 and the input cable 48, and an output portion 75 including the transmission gear box 64 and the output cable 33.

As shown in FIG. 12, the deceleration gear box 61 is configured with a worm gear 62 that is connected to and rotates as a single body with the tip end of the input cable 48, and a worm wheel 63 rotationally driven by the worm gear 62, disposed inside a case 161. In the worm wheel 63 an engaging hole is formed in which a spline shaft 65, provided protruding from the transmission gear box 64 below, is inserted and thus engaged. Due to the rotational force of the input cable 48 being transmitted to the worm wheel 63 via the worm gear 62, the worm wheel 63 is rotationally driven, and that rotational force is transmitted to the transmission gear box 64 via the spline shaft 65.

The transmission gear box 64 is disposed near the front edge of the cross member 24 disposed in front of the occupant seat 4, and fixed to the automobile body floor 3 with an installation bolt, and in a state with the deceleration gear box 61 stacked on the transmission gear box 64, the deceleration gear box 61 and the transmission gear box 64 are connected with a connecting bolt. Further, when the transmission gear box 64 and the deceleration gear box 61 are fastened with the bolt, the spline shaft 65 of the transmission gear box 64 is inserted in the engaging hole of the worm wheel 63 disposed in the deceleration gear box 61, thus connecting the deceleration gear box 61 and the transmission gear box 64 as a single body.

When the screw shaft 47 of the slide driving means 40 is rotationally driven by the drive motor, the slider 44 is screwed to move the seat cushion 35 to the front or back along the guide rail 39, and that driving force is transmitted to the output cable 33 via the input cable 48 and the gear box 60. Due to the output cable 33 rotationally driving the screw shafts 32 of the raising-lowering drive mechanism 6, the slide blocks 34 are screwed toward the front or the rear of the automobile body, the drive links 31 move from a lying state to a standing state, or from a standing state to a lying state, and thus the rear portion of the front side board 15 is driven up or down.

When the screw shaft 47 of the slide driving means 40 is rotationally driven by the drive motor, the slider 44 is screwed to move the seat cushion 35 to the front or back along the guide rail 25, and that driving force is transmitted to the output cable 33 via the input cable 48 and the gear box 60. Due to the output cable 33 rotationally driving the screw shafts 32 of the raising-lowering drive mechanism 6, the slide blocks 34 are screwed toward the front or the rear of the automobile body, the drive links 31 move from a lying state to a standing state, or from a standing state to a lying state, and thus the rear portion of the front side board 15 is driven up or down.

For example, when the short person A sits in the occupant seat 4, when the occupant seat 4 is moved forward in the automobile body, in conjunction with this movement the drive links 31 move from the lying state to the standing state, and the rear portion of the front side board 15 of the floor board 5 changes to the elevated position shown in FIGS. 5 and 10. On the other hand, when the tall person B sits in the occupant seat 4, when the occupant seat 4 is moved backward in the automobile body, in conjunction with this movement the drive links 31 move from the standing state to the lying state, and the rear portion of the front side board 15 of the floor board 5 changes to the lowered position shown in FIG. 1. Thus the height at which the floor board 5, where the heels of the occupant are placed, is provided is adjusted to a position appropriate for the length of the legs of the occupant A or B.

Next is a description of a procedure for assembling a movable floor apparatus as described above, with reference to FIGS. 13 and 14.

First, by installing the raising-lowering drive mechanism 6 and an output portion 75 of the driving force transmission mechanism 10 connected to the raising-lowering drive mechanism 6, a floor board assembly 72 is formed in the floor board 5. Likewise, by installing the seat position adjustment mechanism 38 and an input portion 74 of the driving force transmission mechanism 10 connected to the seat position adjustment mechanism 38, a seat assembly 70 is formed in the occupant seat 4. The work of forming the floor board assembly 72 and the seat assembly 70 is performed in advance outside of the automobile.

Figure 13:
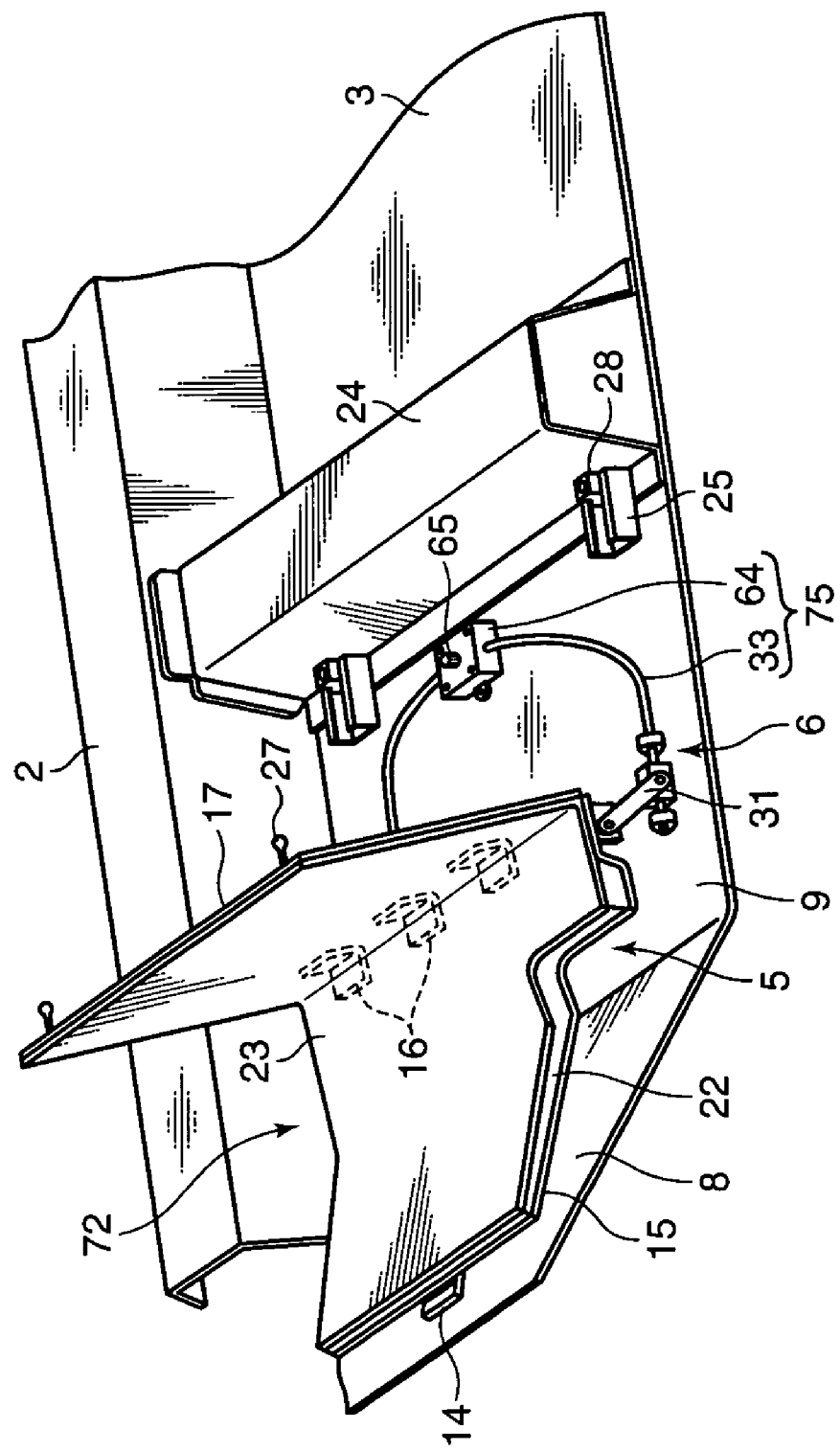
FIG. 13 is a perspective view that illustrates a front half portion in an assembly method of the movable floor apparatus in FIG. 1.

Next, as shown in FIG. 13, of the assemblies 70 and 72, first the floor board assembly 72 is brought into the automobile cabin from a door opening or the like of the automobile body and installed to the automobile body. Specifically, the bearing members 32a and 32b of the raising-lowering drive mechanism 6 fix the transmission gear box 64 of the output portion 75, and the hinge members 14 installed at the front edge of the front side board 15 of the floor board 5, on the automobile body floor 3. However, at this stage, the grommets 27 provided protruding from the lower face of the rear end of the rear side board 17 are not fit with the sliders 28 in the guide rails 25 fixed on the automobile body floor 3, and the rear side board 17 is kept flipped up toward the front of the automobile.

Figure 14:
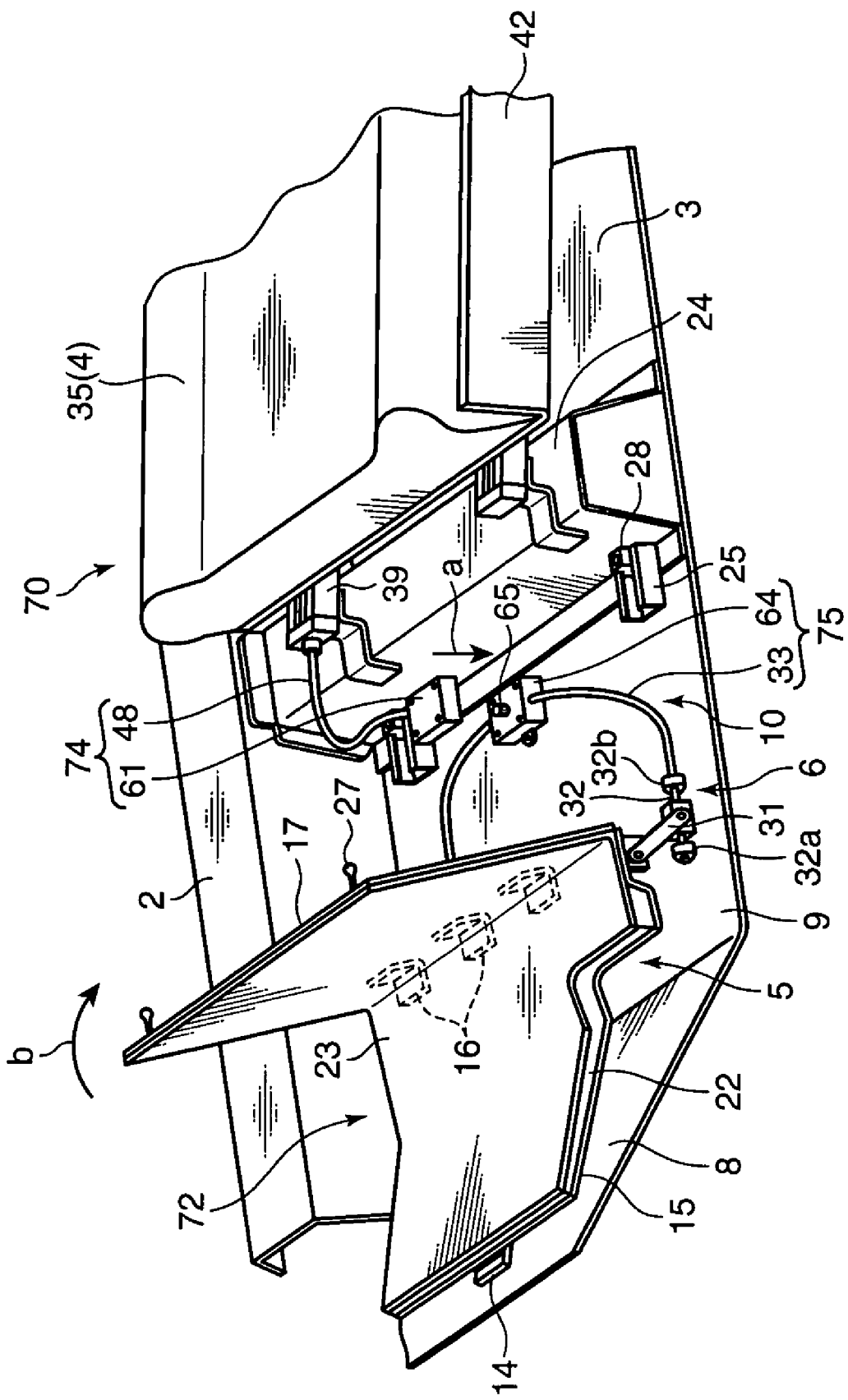
FIG. 14 is a perspective view that illustrates a rear half portion in an assembly method of the movable floor apparatus in FIG. 1.

Next, as shown in FIG. 14, the seat assembly 70 is brought into the automobile cabin, and installed to the automobile body. Specifically, the front end of the guide rails 39 installed to the lower face of the cushion frame 42 of the occupant seat 4 is fixed to the cross member 24 of the automobile body via a bracket or the like, and the rear end of the guide rails 39 is fixed to a rear cross member (FIG. 8).

As shown by arrow a in FIG. 14, the input portion 74 of the driving force transmission mechanism 10 brought into the automobile cabin along with the assembly 70 is connected to the output portion 75 fixed on the automobile body floor 3. Specifically, in a state with the deceleration gear box 61 of the input portion 74 stacked on the transmission gear box 64 of the output portion 75, both of these boxes 61 and 64 are connected and fixed with a connecting bolt. At this time, due to the spline shaft 65 of the transmission gear box 64 being inserted into the engaging hole of the worm wheel 63 disposed within the deceleration gear box 61, the gear mechanism in each of the boxes 61 and 64 are connected such that they can operate in conjunction with each other. Finally, as shown by arrow b in FIG. 14, by laying down the rear side board 17 of the floor board 5 toward the rear of the automobile, the grommets 27 provided protruding from the lower face of the rear end of the rear side board 17 are fit with the sliders 28 in the guide rails 25 fixed on the automobile body floor 3, thus completing the movable floor apparatus of the present embodiment.

In the movable floor apparatus as described above, the floor board 5 that covers the upper face of the automobile body floor 3 and the raising-lowering drive mechanism 6 that raises or lowers the floor board 5 are provided in the foot area of the occupant seated in the occupant seat 4, and also provided are the toe board portion 8 sloping downward to the rear and the floor base portion 9 that extends in the rearward direction of the automobile body continuous with the rear end of the toe board portion 8. Provided in the floor board 5 are the toe board corresponding portion 18 that corresponds to the toe board portion 8 of the automobile body floor 3 and the floor base corresponding portion 19 that corresponds to the floor base portion 9, and because the toe board corresponding portion 18 and the floor base corresponding portion 19 of the floor board 5 are formed in a flattened V-like shape when viewed from the side, this movable floor apparatus has the advantage that it is possible to drive the floor board 5, positioned in the foot area of an occupant seated in the occupant seat 4, up or down appropriately.

That is, this movable floor apparatus is configured such that by forming the toe board corresponding portion 18 and the floor base corresponding portion 19 of the floor board 5 in a V-like shape when viewed from the side, the floor board 5 is allowed to correspond to the automobile body floor 3 positioned in the foot area of an occupant seated in the occupant seat 4, i.e., the floor board 5 is allowed to correspond to the shape of the automobile body floor 3, which includes the toe board portion 8 sloping downward to the rear and the floor base portion 9 that extends in the rearward direction of the automobile body continuous with the rear end of the toe board portion 8. Thus, when the floor board 5 has been lowered corresponding to the physique of the occupant, by matching the toe board corresponding portion 18 and the floor base corresponding portion 19 to the toe board portion 8 and the floor base portion 9 of the automobile body floor 3, it is possible to prevent a space from being formed between the floor board 5 and the automobile body floor 3 even when a large range in the front-rear direction of the automobile body is set for installation of the floor board 5. Accordingly, this movable floor apparatus has the advantage that it is possible to move the floor board 5 up or down with the raising-lowering drive mechanism 6 according to the physique or the like of the occupant while insuring a sufficient range of movement for feet placed on the floor board 5, and by preventing a space from being formed between the floor board 5 and the automobile body floor 3, it is possible to insure that the floor board 5 is lowered a sufficient amount without positioning the automobile body floor 3 lower than necessary.

Also, in the first embodiment described above, when the short person A sits in the occupant seat 4 in a state with their knees significantly bent and the portion of the legs beneath the knees falling at a predetermined angle, in a state with the front end of the toe board corresponding portion 18, which constitutes the front side board 15 of the floor board 5, pivotably attached to and supported by the toe board portion 8 of the automobile body floor 3, as shown in FIGS. 5 and 10, the rear portion of the front side board 15 is moved to an elevated position by the raising-lowering drive mechanism 6 so that the floor base corresponding portion 19 of the front side board 15 is sloping down and to the front. Thus, when the short person A operates the brake pedal 12 or the like by pushing it forward, it is possible to smoothly move the heel portion toward the front of the automobile body along the floor base corresponding portion 19.

In particular, as illustrated in the above first embodiment, a configuration is adopted such that the front side board 15 whose front end is supported by the automobile body floor 3, and the rear side board 17 bendably connected to the rear end of the front side board 15 via a connecting member constituted from the hinge members 16, are provided in the floor board 5, and the rear end of the rear side board 17 is moved to the front or to the rear along the floor base portion 9 of the automobile body floor 3. With this configuration, by elevating the connecting portion of the front side board 15 and the rear side board 17 to fold the floor board 5 up like a mountain when viewed from the side using the raising-lowering drive mechanism 6 that raises or lowers the floor board 5, it is possible to easily and appropriately change the height or the like at which the floor board 5 is provided according to the physique of the occupant.

That is, the floor board 5 is divided into the front side board 15 whose front end is supported by the automobile floor 3 and the rear side board 17 bendably connected to the rear end of the front side board 15 via a connecting member constituted from the hinge members 16, and by raising or lowering the connecting portion of the boards 15 and 17, it is possible to adjust the height at which the floor board 5 is provided, so unlike a configuration in which one end of a one-sheet floor board having a large area is used as a fulcrum and the other end is driven up or down, thus moving the floor board 5 as a single body to adjust the height at which the floor board 5 is provided, with the configuration according to the first embodiment described above, it is possible to appropriately adjust the height at which the floor board 5 is provided without a situation occurring in which the front end or the rear end of the floor board is swung a large amount thus causing a large change in the space between the floor board and the automobile body floor 3. In addition, in comparison to a case in which a one-sheet floor board is driven up or down in order to adjust the height at which the floor board is provided, the configuration according to the first embodiment described above has the advantage that the floor board 5 can easily be driven up or down with a small driving force. Moreover, the configuration according to the first embodiment described above has the advantage that the change in the front-rear dimension of the floor board 5 that occurs when raising or lowering the connecting portion of the front side board 15 and the rear side board 17 with the raising-lowering drive mechanism 6 can be absorbed below the front of the occupant seat 4, i.e. that change can be absorbed in the rear portion of the rear side board 17 introduced below the knees of the occupant, and thus it is possible to prevent the occupant from feeling discomfort in the area of the occupant's feet due to changes in the front-rear dimension of the floor board 5.

Also, in the first embodiment described above, the drive links 31 are disposed with their tip end connected to the rear of the floor base corresponding portion 19, and by moving the base end of the drive links 31 to the front or to the rear along the automobile body floor 3, a link drive mechanism, specifically a drive mechanism configured from the screw shafts 32, the slide blocks 34, and the like, erects or lays down the drive links 31 to drive the floor board 5 up or down. The raising-lowering drive mechanism 6 is configured with these drive links 31 and the link drive mechanism, so the rear of the front side board 15, whose front end is pivotably attached to the toe board portion 8 of the automobile body floor 3, can be driven up or down with a light force while being supported by the drive links 31. In addition, the first embodiment described above has the advantage that while the load placed on the floor board 5 by the heels of the occupant placed on the floor base corresponding portion 19 is supported by the drive links 31, the floor board 5 can be appropriately driven up or down.

Further, when adopting a configuration as disclosed in the first embodiment above, in which a left and right pair of the drive links 31 and link drive mechanisms are provided, and driving force is transmitted to the left and right link drive mechanisms from a single drive source (the drive motor of the seat position adjustment mechanism 38) via the driving force transmission mechanism 10, there is the advantage that by supporting both the left and right sides of the floor board 5 with the drive links 31, a stably supported state is obtained for the floor board 5, and it is possible to easily drive the floor board 5 up or down with a simple configuration.

Also, when adopting a configuration as disclosed in the first embodiment above, in which by providing the driving force transmission mechanism 10 between the seat position adjustment mechanism 38 and the raising-lowering drive mechanism 6, the floor board 5 is driven up or down by the raising-lowering drive mechanism 6 in conjunction with the occupant seat 4, which is driven in the front-rear direction by the slide driving means 40 of the seat position adjustment mechanism 38, there is the advantage that it is possible to drive both the seat position adjustment mechanism 38 and the raising-lowering drive mechanism 6 with a single drive source, so the front-rear position of the occupant seat 4 and the height at which the floor board 5 is provided can be easily adjusted with a simple configuration.

Also, when adopting a configuration as disclosed in the first embodiment above, in which the driving force transmission mechanism 10 is configured with the input cable 48 and the output cable 33 that transmit driving force by rotating around a shaft, and the gear box 60 in which the cables 48 and 33 are connected such that they can operate together, there is the advantage that with a simple configuration, it is possible to stably transmit the driving force of the seat position adjustment mechanism 38 to the raising-lowering drive mechanism 6.

That is, it is also possible to configure the input cable 48 with, for example, a tension cable that slides in the direction of the shaft according to the front-rear movement of the seat cushion 35, and to configure the gear box 60 with a roller (pulley) around which the tension cable is wound and a gear mechanism that transmits the rotational force of the roller to the output cable 33. However, when such a configuration is adopted, it becomes necessary to provide two cables, namely a cable pulled when the seat cushion 35 is moved forward and a cable pulled when the seat cushion 35 is moved toward the rear, as the input cable, so the configuration becomes more complicated. On the other hand, with the first embodiment above, it is possible to more simply configure the driving force transmission mechanism 10.

Also, when adopting a configuration as disclosed in the first embodiment above, in which after temporarily reducing the rotational velocity of the input cable 48 with the deceleration gear box 61, the driving force after speed reduction is transmitted to the output cable 33 via the transmission gear box 64, it is possible to drive, with an appropriate stroke as necessary, the occupant seat 4, which needs, for example, to be moved to the front or to the rear about 100 mm according to the physique of the occupant, the floor board 5 which needs only a small amount of vertical movement in comparison to the occupant seat 4, and the slide blocks 34 that, specifically, are driven, for example, about 10 mm in the front-rear direction in order to raise or lower the floor board 5. Also, because the driving force is increased along with reducing the rotational velocity of the input cable 48, and then transmitted to the output cable 33, even when some amount of driving force transmission loss occurs, it is not necessary to change the capacity of the drive source. Accordingly, the seat position adjustment mechanism 38 and the raising-lowering drive mechanism 6 can be reliably driven with a small capacity drive source.

Also, when adopting a configuration as disclosed in the first embodiment above, in which the gear box 60 of the driving force transmission mechanism 10 is fixed on the automobile body floor 3 in the vicinity of the cross member 24 that supports the front end of the occupant seat 4, there is the advantage that the gear box 60 can be disposed in a dead space below the occupant seat 4 such that gear box 60 does not become an obstruction. Instead of fixing the gear box 60 on the automobile body floor 3 in the vicinity of the cross member 24, the gear box 60 may be fixed to, for example, the front face of the cross member 24.

Also, when adopting a configuration as disclosed in the first embodiment above, in which the gear box 60 of the driving force transmission mechanism 10 is configured from two gear boxes, namely the deceleration gear box 61 and the transmission gear box 64 configured such that they can be connected, because the driving force transmission mechanism 10 is divided into two parts, namely the input portion 74 configured from the deceleration gear box 61 and the input cable 48, and the output portion 75 configured from the transmission gear box 64 and the output cable 33, it is possible to improve the assemblability of the movable floor apparatus. That is, when the driving force transmission mechanism 10 is configured with two parts as described above, as in the assembly method described in the above embodiment, after performing, in advance in a large area outside of the automobile, the work of assembling the output portion 75 and the raising-lowering drive mechanism 6 to the floor board 5 to form the floor board assembly 72, and the work of assembling the input portion 74 and the seat position adjustment mechanism 38 to the occupant seat 4 to form the seat assembly 70, the separately formed seat assembly 70 and floor board assembly 72 can be easily brought into the automobile cabin from a door opening or the like of the automobile body and installed in the automobile body. Thus, the movable floor apparatus can easily be assembled.

Also, in the first embodiment above, the gear box 60 of the driving force transmission mechanism 10 was configured from the deceleration gear box 61 having a deceleration gear mechanism configured from the worm gear 62 and the worm wheel 63, and the transmission gear box 64 having a transmission gear mechanism configured from the first and second bevel gears 66 and 67, but a suitable structure for the gear box 60 is not limited to such an example. For example, if the deceleration gear box 61 reduces the rotational velocity of the input cable 48, the deceleration gear box 61 is not limited to a structure as described above; the deceleration gear box 61 may be configured, for example, by combining a plurality of gear wheels having different numbers of teeth. However, a configuration in which the worm gear 62 and the worm wheel 63 are used, as in the above first embodiment, has the advantage that the deceleration gear box 61 can be more compactly configured. Also, the transmission gear box 64 is not limited to a structure as described above; various gear mechanisms or the like are applicable.

Also, in first embodiment above, the raising-lowering drive mechanism 6 is disposed below the floor board 5, and the impact absorbing member 22 is provided on the upper face of the floor board 5. Thus, the first embodiment above has the advantage that the height at which the floor board 5, where the feet of the occupant are placed, is provided can be appropriately adjusted with the raising-lowering drive mechanism 6 provided below the floor board 5 to maintain the seating position of the occupant in an appropriate state, and by providing the impact-absorbing member 22 on the upper face of the floor board 5, it is possible to effectively protect the lower legs of the occupant during an automobile collision.

That is, because the impact-absorbing member 22, constituted from an elastic body of, for example, urethane foam material or synthetic rubber material, is disposed on the surface of the floor board 5, whose placement height is adjusted according to the physique or the like of the occupant, there is the advantage that when an automobile collision accident occurs in a state in which the occupant seated in the occupant seat 4 has placed their heels on the impact-absorbing member 22 on the floor board 5, it is possible for the impact-absorbing member 22 to absorb the impact load that acts on the heels or the like of the occupant from the floor board 5, and thus the lower legs of the occupant can be effectively protected.

Also, in the first embodiment above, the impact-absorbing member 22 is disposed across the toe band corresponding portion 18 and the floor base corresponding portion 19 of the floor board 5, so there is the advantage that when an automobile collision accident occurs in a state in which the occupant has placed their heels on the impact-absorbing member 22, it is possible for the impact-absorbing member 22 to effectively absorb the impact load applied to the heels or the like of the occupant, and thus the lower legs of the occupant can be effectively protected.

Moreover, as described in the first embodiment above, when the impact-absorbing member 22 is disposed across approximately the entire width of the floor board 5, a sufficient width is insured for the impact-absorbing member 22, which has the above function of absorbing the impact load, and thus the lower legs of the occupant can be effectively protected.

Also, in the first embodiment above, the concave portion 21 concave downward is formed in the front portion of the floor board 5, specifically in the front side board 15, and the impact-absorbing member 22 is disposed in the concave portion 21, so there is the advantage that even when the impact-absorbing member 22 having a predetermined thickness is provided only in the front portion of the floor board 5, formation of a large step in height in the upper end face of the floor board 5 is prevented, and it is possible to flatly form the upper end face. Moreover, when a load pushing the impact-absorbing member 22 rearward has been applied during an automobile collision, rearward movement of the impact-absorbing member 22 is prevented due to causing the rear end of the impact-absorbing member 22 to make contact with the step formed in the rear end portion of the concave portion 21, so the installed state of the impact-absorbing member 22 can be maintained.

In particular, as described in the first embodiment above, when approximately the same height is set for the upper face of the impact-absorbing member 22 disposed in the concave portion 21 and the upper face of the floor board 5 continuous with the concave portion 21, specifically the rear portion of the front side board 15, it is possible to suppress the occurrence of discomfort when feet placed on the floor board 5 are moved while insuring sufficient thickness of the impact-absorbing member 22, and it is also possible to effectively improve operability when operating the accelerator pedal 11 or the like.

Also, in the second embodiment above, the floor board mat 23 is provided covering and continuous with the upper face of the impact-absorbing member 22 disposed in the concave portion 21 and the upper face of the floor board 5 (the rear portion of the front side board 15 and the rear side board 17) continuous with the concave portion 21, so there is the advantage that it is possible to effectively flatten the upper end face of the floor board 5, and thus it is possible to further suppress the occurrence of discomfort when feet placed on the floor board 5 are moved.

Also, as described in the first embodiment above, when, in an automobile in which the cross member 24 extending in the widthwise direction of the automobile has been provided below the front of the occupant seat 4, the rear end of the rear side board 17 has been extended to a position adjacent to the cross member 24, the rear of the rear side board 17, which moves to the front or to the rear in accordance with raising or lowering the connecting portion of the front side board 15 and the rear side board 17, can be positioned concealed between the front lower face of the seat cushion 35 and the front wall face of the cross member 24. Accordingly, there is the advantage that it is possible to effectively prevent the rear of the rear side board 17 from moving to the front or to the rear to cause discomfort to the user.

Further, in the first embodiment above, in an automobile configured with the floor board 5 divided into the front side board 15 and the rear side board 17, and the front end of the front side board 15 is pivotably attached to the toe board portion 8 of the automobile body floor 3, and the rear of the rear side board 17 is supported such that it can slide in the front-rear direction of the automobile body along the floor base portion 9 of the automobile body floor 3, the width dimension of the rear side board 17 is set such that approximately the entire area between the floor tunnel 2 provided in the center in the widthwise direction of the automobile body and the side sill 1 provided on the left and right sides of the automobile body is covered by the rear side board 17 of the floor board 5. Thus, there is the advantage that while preventing an increase in driving force when driving the floor board 5 up or down, it is possible to insure a sufficient placement face on which the occupant's feet are placed.

Also, as described in the first embodiment above, when, in an automobile provided with operating pedals constituting at least the accelerator pedal 11 and the brake pedal 12, operated by the driver, and the foot rest 13 provided along with those operating pedals, the front (the toe board corresponding portion 18) of the floor board 5 is extended out below the operating pedals, and the avoiding portion 20 that avoids the foot rest 13 is provided in the front of the floor board 5, it is possible to insure a sufficient area for providing the floor board 5 while preventing the front of the floor board 5 from obstructing the foot rest 13.

Also, in the first embodiment described above, the rear heat duct 29 is provided in the automobile floor 3, extending toward the rear of the automobile body from the side of the floor tunnel 2 through an area below the floor board 5, and a cut-out 5a is formed in a side portion of the floor board 5 in order to avoid interfering with the rear heat duct 29. Thus, there is the advantage that the side portion of the floor board 5 is prevented from interfering with the rear heat duct 29, and it is possible to appropriately provide the rear heat duct 29 while sufficiently insuring the widthwise dimension for the floor board 5.

Second Embodiment

As stated in the first embodiment above, an automobile body floor mat is provided on the upper face of the automobile body floor 3, but because the floor board 5 is provided above the automobile body floor mat such that the floor board 5 can be raised or lowered, it is necessary to provide the automobile body floor mat such that the raising or lowering operation of the floor board 5 is not hindered. Accordingly, in the second embodiment, such an exemplary embodiment of a movable floor apparatus focusing on the relationship with the automobile body floor mat is described with reference to FIGS. 15 and 16. In these drawings, the same elements as in the first embodiment described above have the same reference numerals, and a detailed description thereof is omitted here. Also, the rear heat duct 29 and the concave groove portion 30 shown in FIG. 7 are omitted from FIG. 16.

Figure 15:
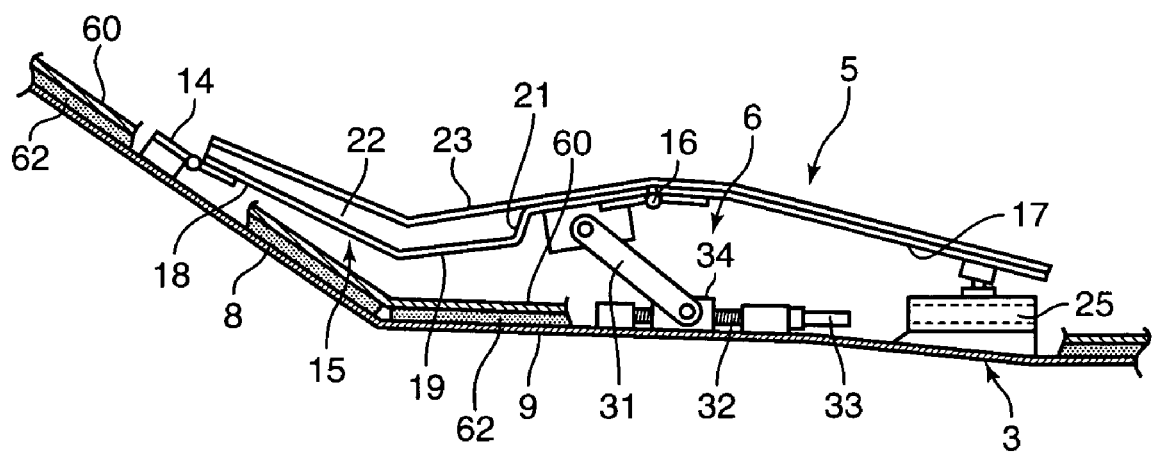
FIG. 15 is a side cross-sectional view that illustrates a movable floor apparatus according to a second embodiment of the present invention.
Figure 16:
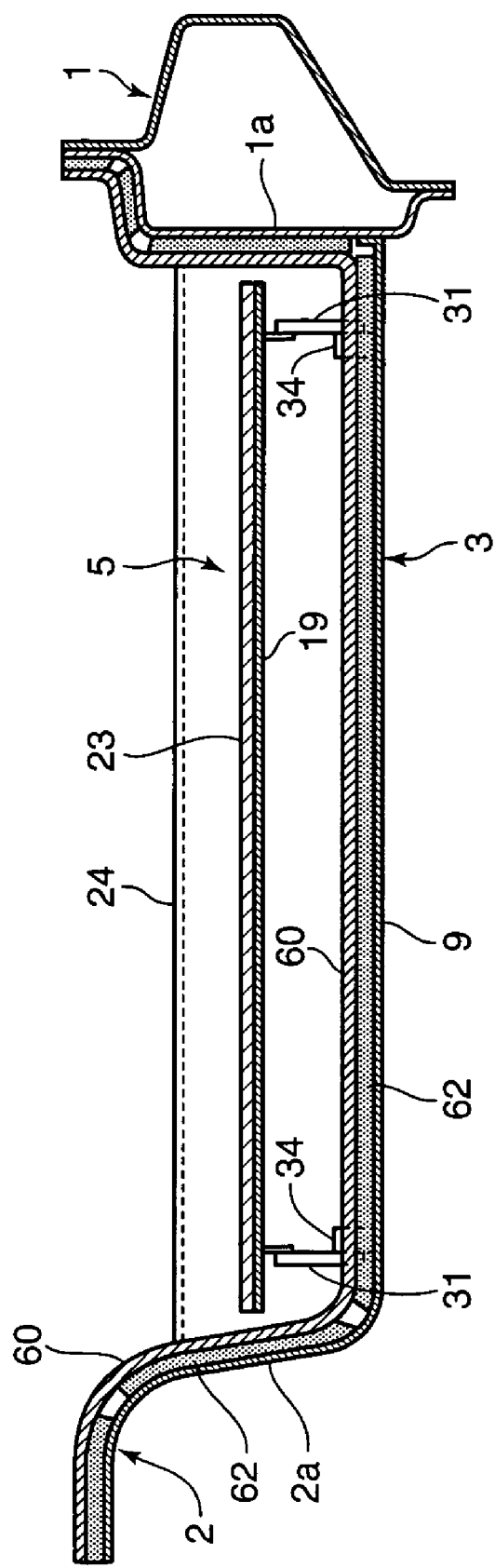
FIG. 16 is a front cross-sectional view of the movable floor apparatus in FIG. 15.

As shown in FIGS. 15 and 16, an automobile body floor mat 60 is provided on the upper face of the automobile body floor 3, via an insulator 62 (mel sheet) having functions to provide sound and thermal insulation. The automobile body floor mat 60 is configured from, for example, a surface layer mat material constituted from, for example, pile material and backing, and a supplemental material (for example, felt or rubber material) affixed to the back face of the surface layer as necessary. On the other hand, the insulator 62 provided on the bottom side of the automobile body floor mat 60 is configured by, for example, layering a skin material such as nonwoven cloth on porous material such as felt, glass wool, or polyurethane foam. The automobile body floor mat 60 and the insulator 62 are notched at a location corresponding to the portion the hinge member 14, the guide rails 25, and the like are provided, so that members such as the hinge member 14 and the guide rails 25 are directly fixed to the automobile body floor 3 without intercession by the automobile body floor mat 60 or the like.

The automobile body floor mat 60 is provided so as to cover across approximately the entire face of the automobile body floor, including an area of the upper face of the automobile body floor 3 positioned below the floor board 5. Also, as shown in FIG. 16, the automobile body floor mat 60 is provided so as to also cover the side sill 1 and the floor tunnel 2. In the side sill 1 and the floor tunnel 2, side wall faces of the side sill 1 and the floor tunnel 2 form vertical faces 1a and 2a extending in approximately the vertical direction adjacent to both ends of the floor board 5 in the widthwise direction of the automobile, and the automobile body floor mat 60 is provided laid out along the vertical faces 1a and 2a.

On the other hand, as described in the first embodiment above, the floor board mat 23 constituted from, for example, pile material and backing, is provided on the upper face of the floor board 5. The floor board mat 23, as is clear from FIGS. 15 and 16, is formed separately from the automobile body floor mat 60 covering the upper face of the automobile body floor 3. Also, the floor board mat 23 is provided so as to directly cover the upper face of the floor board 5, and unlike in the case of the automobile body floor mat 60, the insulator 62 is not provided between the floor board mat 23 and the floor board 5.

In the configuration of the second embodiment as described above, the floor board 5 is driven up or down by the raising-lowering drive mechanism 6 in the same manner as in the first embodiment above, and thus is configured to move up or down in the vertical direction when viewed from the front. At this time, the vertical faces 1a and 2a formed by the side wall faces of the side sill 1 and the floor tunnel 2 as shown in FIG. 16 are provided adjacent to both ends of the floor board 5 in the widthwise direction of the automobile, so between the automobile body floor mat 60 provided laid out along the vertical faces 1a and 2a, and both ends of the floor board 5 in the widthwise direction of the automobile, an approximately constant gap is formed regardless of the vertical position of the floor board 5.

According to the configuration of the second embodiment as described above, the upper face of the floor board 5 disposed movable up or down on the automobile body floor 3 is covered with the floor board mat 23 configured separately from the automobile body floor mat 60 that covers the upper face of the automobile body floor 3, so the raising or lowering operation of the floor board 5 is not hindered by the presence of the automobile body floor mat 60, and it is easily possible to allow the floor board mat 23 that independently covers only the floor board 5 to follow the raising or lowering operation of the floor board 5. As a result, by providing a floor mat (the automobile body floor mat 60 and the floor board mat 23) laid out on both the automobile body floor 3 and the floor board 5, it is possible for both an improvement in the outer appearance of the floor portion and smooth operation to raise or lower the floor board 5 to be well achieved.

Also, as in the second embodiment above, when the area of the upper face of the automobile body floor 3 located below the floor board 5 is covered with the automobile body floor mat 60, and that region is covered continuous with other areas, there is the advantage that it is possible to prevent a large opening from being formed in the automobile body floor mat 60 at a position below the floor board 5, and so it is possible to effectively prevent a situation in which foreign matter such as gravel intrudes between the automobile floor mat 60 and the automobile body floor 3 through that opening.

Also, as in the second embodiment above, when the insulator 62 is provided only on the lower face of the automobile body floor mat 60, and the insulator 62 is not provided on the lower face of the floor board mat 23 layered with the automobile floor mat 60 in a plan view, there is the advantage that while insuring sufficient sound insulation of the floor portion, it is possible to prevent a situation in which the height of the upper face (face where the feet of the occupant are placed) of the floor board mat 23 becomes unnecessarily high due to the insulator 62 being doubly provided, and thus it is possible to maintain the riding comfort of the automobile cabin interior in a good state.

Also, as in the second embodiment above, when the floor board 5 is raised or lowered in the vertical direction when viewed from the front, and the automobile body floor mat is provided laid out along the vertical faces 1a and 2a extending in approximately the vertical direction adjacent to both ends of the floor board 5 in the widthwise direction of the automobile, there is the advantage that it is possible to raise or lower the floor board 5 while maintaining a small value for the space between the automobile body floor mat 60 and both ends of the floor board 5, so it is possible to effectively prevent a situation in which foreign matter such as dust intrudes from that space, and it is possible to well maintain the outer appearance of the floor portion.

Also, as in the second embodiment above, when the side walls of the side sill 1 and the floor tunnel 2 of the automobile body are provided extending in approximately the vertical direction, and the vertical faces 1a and 2a are formed by the side wall faces of the side sill 1 and the floor tunnel 2, it is possible to raise or lower the floor board 5 while maintaining a small value for the space between both ends of the floor board 5 provided so as to cover approximately the entire area in the widthwise direction between the side sill 1 and the floor tunnel 2 and the automobile body floor mat 60 provided laid out along the side walls (the vertical faces 1a and 2a) of the side sill 1 and the floor tunnel 2. That is, when the floor tunnel 2 is formed tapering upward as in a conventional automobile, as the floor board 5 rises the space between the side wall face of the floor tunnel 2 and the floor board 5 will increase, so there an increased risk that foreign matter such as dust will intrude, and the outer appearance of the floor portion also is impaired. In this case as well, for example, if the widthwise dimension of the floor board 5 is enlarged due to the side portion of the floor board 5 protruding to the side when the floor board 5 rises, it is possible to address the above sort of problem, but a mechanism for enlarging the widthwise dimension of the floor board 5 is complicated, and this creates a problem such as increased cost. On the other hand, according to above embodiments, with a simple and rational configuration, it is possible to maintain a small value for the space between the ends of the floor board 5, so it is possible to prevent the invasion of foreign matter from the space and to improve the outer appearance.

In the second embodiment above, the insulator 62 is provided only on the lower face of the automobile body floor mat 60, and not on the lower face of the floor board mat 23, but if there is no particular problem with respect to insuring space in the automobile cabin, the insulator 62 may be provided on both the lower face of the automobile body floor mat 60 and on the lower face of the floor board mat 23. Also, opposite to the above embodiments, the insulator 62 may be provided only on the lower face of the floor board mat 23, and not on the lower face of the automobile body floor mat 60.

As described based on the above embodiments, the present invention provides an automobile movable floor apparatus including a floor board that covers the upper face of an automobile body floor and a raising-lowering drive mechanism that raises or lowers the floor board, provided in the foot area of an occupant seated in an occupant seat, and a toe board portion sloping down to the rear and a floor base portion that extends toward the rear of the automobile body and is continuous with the rear end of the toe board portion, provided in the automobile body floor, the floor board including a toe board corresponding portion that corresponds to the toe board portion of the automobile body floor, and a floor base corresponding portion that corresponds to the floor base portion, the toe board corresponding portion and the floor base corresponding portion being formed in a flattened V-like shape when viewed from the side.

According to the present invention, when the floor board has been lowered corresponding to the physique of the occupant, by matching the toe board corresponding portion and the floor base corresponding portion to the toe board portion and the floor base portion of the automobile body floor, it is possible to prevent a space from being formed between the floor board and the automobile body floor even when a large range in the front-rear direction of the automobile body is set for installation of the floor board. Thus, this movable floor apparatus has the advantage that it is possible to move the floor board up or down with the raising-lowering drive mechanism according to the physique or the like of the occupant while insuring a sufficient range of movement for feet placed on the floor board, and by preventing a space from being formed between the floor board and the automobile body floor, it is possible to insure that the floor board is lowered a sufficient amount without positioning the automobile body floor lower than necessary.

It is preferable that the front end of the toe board corresponding portion of the floor board is pivotably attached to the toe board portion of the automobile body floor, and the raising-lowering drive mechanism is configured so as to lift the rear of the floor base corresponding portion upward to place the floor base corresponding portion in a state sloping downward to the front.

According to this configuration, when a short person sits in the occupant seat in a state with their knees significantly bent and the portion of the legs beneath the knees falling at a predetermined angle, in a state with the front end of the toe board corresponding portion, which constitutes the front side board of the floor board, pivotably attached to and supported by the toe board portion of the automobile body floor, the rear portion of the front side board is moved to an elevated position by the raising-lowering drive mechanism so that the floor base corresponding portion of the front side board is sloping down and to the front. Thus, when the short person operates the brake pedal or the like by pushing it forward, it is possible to smoothly move the heel portion toward the front of the automobile body along the floor base corresponding portion.

It is preferable that the floor board includes a front side board including the toe board corresponding portion and the floor base corresponding portion, and a rear side board bendably connected to the rear end of the front side board via a connecting member, and that the rear of the rear side board is supported such that the rear of the rear side board can slide in the front-rear direction of the automobile body along the floor base portion of the automobile body floor.

With this configuration, there is the advantage that the change in the front-rear dimension of the floor board that occurs when raising or lowering the connecting portion of the front side board and the rear side board can be absorbed in the rear portion of the rear side board introduced below the front of the occupant seat, and thus it is possible to prevent the occupant from feeling discomfort in the area of the occupant's feet due to changes in the front-rear dimension of the floor board.

It is preferable that the raising-lowering drive mechanism includes a drive link whose tip end is connected to the rear of the floor base corresponding portion, and a link drive mechanism that, by moving the base end of the drive link forward or to the rear along the automobile body floor, erects or lays down the drive link to drive the floor board up or down.

With this configuration, the rear of the front side board, whose front end is pivotably attached to the toe board portion of the automobile body floor, can be driven up or down with a light force while being supported by the drive links, and the floor board can be appropriately driven up or down while the load placed on the floor board by the heels of the occupant placed on the floor base corresponding portion is supported by the drive links.

It is preferable that a left and right pair of the drive links and the link drive mechanisms are provided, and driving force is transmitted to each of the link drive mechanisms via a driving force transmission mechanism from a single drive source.

With this configuration, there is the advantage that by supporting the left and right sides of the floor board with the left and right drive links, a stably supported state of the floor board is obtained, and it is possible to easily drive the floor board up or down with a simple configuration using a single drive source.

In the present invention, it is preferable that the automobile movable floor apparatus includes a seat position adjustment mechanism that drives a seat cushion of the occupant seat in at least the front-rear direction; and a driving force transmission mechanism that transmits the driving force of the seat position adjustment mechanism to the raising-lowering drive mechanism; and that the floor board is driven up or down by the raising-lowering drive mechanism in conjunction with the occupant seat driven in the front-rear direction by the seat position adjustment mechanism.

With this configuration, there is the advantage that it is possible to drive both the seat position adjustment mechanism and the raising-lowering drive mechanism with a single drive source, so the front-rear position of the occupant seat and the height at which the floor board is provided can be easily adjusted with a simple configuration.

It is preferable that the driving force transmission mechanism includes an input cable that obtains driving force from the drive source provided in the seat position adjustment mechanism and rotates around a shaft; an output cable that rotates around a shaft according to the rotation of the input cable, thus transmitting driving force to the raising-lowering drive mechanism; and a gear box in which the input cable and the output cable are connected such that the input cable and the output cable are operable in conjunction with each other.

When, in this manner, the driving force transmission mechanism is configured with the input cable and the output cable that transmit driving force by rotating around a shaft, and the gear box in which these cables are connected such that they can operate together, there is the advantage that with a simple configuration, it is possible to stably transmit the driving force of the seat position adjustment mechanism to the raising-lowering drive mechanism.

It is preferable that the gear box of the driving force transmission mechanism includes a deceleration gear mechanism that reduces the rotational velocity of the input cable; and a transmission gear mechanism that transmits the driving force after deceleration to the output cable.

When, in this manner, after temporarily reducing the rotational velocity of the input cable, the driving force after speed reduction is transmitted to the output cable, it is possible to drive, with an appropriate stroke as necessary, the occupant seat, which needs to be moved to the front or to the rear according to the physique of the occupant, and the floor board, which needs only a small amount of vertical movement in comparison to the occupant seat. Also, because the driving force is increased along with reducing the rotational velocity of the input cable, and then transmitted to the output cable, even when some amount of driving force transmission loss occurs, it is not necessary to change the capacity of the drive source. Accordingly, the seat position adjustment mechanism and the raising-lowering drive mechanism can be reliably driven with a small capacity drive source.

It is preferable that the gear box of the driving force transmission mechanism is provided protruding from the upper face of the automobile body floor, and is fixed to the cross member that supports the front end of the occupant seat or fixed to the automobile body floor in the vicinity thereof.

When, in this manner, the gear box of the driving force transmission mechanism is fixed to the cross member that supports the front end of the occupant seat or fixed to the automobile floor in the vicinity thereof, there is the advantage that the gear box can be disposed in a dead space below the occupant seat such that gear box does not become an obstruction.

It is preferable that the raising-lowering drive mechanism is disposed below the floor board, and an impact-absorbing member is provided on the upper face of the floor board.

With this configuration, there is the advantage that the height at which the floor board, where the feet of the occupant are placed, is provided can be appropriately adjusted with the raising-lowering drive mechanism provided below the floor board to maintain the seating position of the occupant in an appropriate state, and by providing the impact-absorbing member on the upper face of the floor board, it is possible to effectively protect the lower legs of the occupant during an automobile collision.

It is preferable that the impact-absorbing member is disposed on the floor board across approximately the entire width of the automobile.

With this configuration, a sufficient width is insured for the impact-absorbing member, which has the above function of absorbing the impact load, and thus the lower legs of the occupant can be effectively protected.

It is preferable that a concave portion concave downward is formed in the front portion of the floor board, and the impact-absorbing member is disposed in the concave portion.

With this configuration, even when the impact-absorbing member having a predetermined thickness is provided only in the front portion of the floor board, formation of a large step in height in the upper end face of the floor board is prevented, so it is possible to flatly form the upper end face, and when a load pushing the impact-absorbing member rearward has been applied during an automobile collision, rearward movement of the impact-absorbing member is prevented due to causing the rear end of the impact-absorbing member to make contact with the step formed in the rear end of the concave portion, so the installed state of the impact-absorbing member can be maintained.

It is preferable that the automobile movable floor apparatus includes operating pedals operated by a driver, constituting at least an accelerator pedal and a brake pedal, and provided above the toe board portion of the automobile body floor; and a foot rest provided to the side of those operating pedals; in which the front of the floor board extends out below the operating pedals; and an avoiding portion that avoids obstructing the foot rest is provided in a side portion of the floor board.

With this configuration, there is the advantage that it is possible to insure a sufficient area for providing the floor board while preventing the front of the floor board from obstructing the foot rest.

It is preferable that a rear heat duct is provided in the automobile body floor that extends toward the rear of the automobile body from a side of a floor tunnel through an area below the floor board, and a cut-out is formed in a side portion of the floor board in order to avoid interference with the rear heat duct.

With this configuration, there is the advantage that the side portion of the floor board is prevented from interfering with the rear heat duct, and it is possible to appropriately provide the rear heat duct while sufficiently insuring the widthwise dimension for the floor board.

It is preferable that an automobile body floor mat is provided laid out on the automobile body floor and covering the upper face thereof; and a floor board mat, separate from the automobile body floor mat, is provided laid out on the floor board.

With this configuration, the raising or lowering operation of the floor board is not hindered by the presence of the automobile body floor mat, so it is easily possible to allow the floor board mat that independently covers only the floor board to follow the raising or lowering operation of the floor board. As a result, by providing a floor mat (the automobile body floor mat and the floor board mat) laid out on both the automobile body floor and the floor board, it is possible for both an improvement in the outer appearance of the floor portion and smooth operation to raise or lower the floor board to be well achieved.

It is preferable that the automobile body floor mat covers the upper face of the automobile body floor, including an area located below the floor board, and the automobile body floor mat is provided laid out so as to continuously cover that area and another area.

When, in this manner, the area of the upper face of the automobile body floor located below the floor board is covered with the automobile body floor mat, and that region is covered continuous with other areas, there is the advantage that it is possible to prevent a large opening from being formed in the automobile body floor mat at a position below the floor board, and so it is possible to effectively prevent a situation in which foreign matter such as gravel intrudes between the automobile floor mat and the automobile body floor through that opening.

It is preferable that the floor board is driven up or down in approximately the vertical direction when viewed from the front, and the automobile body floor mat is provided laid out along vertical faces provided so as to extend in approximately the vertical direction adjacent to both ends of the floor board in the widthwise direction of the automobile.

When, in this manner, the floor board is raised or lowered in the vertical direction when viewed from the front, and the automobile body floor mat is provided laid out along the vertical faces extending in approximately the vertical direction adjacent to both ends of the floor board in the widthwise direction of the automobile, there is the advantage that it is possible to raise or lower the floor board while maintaining a small value for the space between the automobile body floor mat and both ends of the floor board, so it is possible to effectively prevent a situation in which foreign matter such as dust intrudes from that space, and it is possible to well maintain the outer appearance of the floor portion.

It is preferable that the floor board is provided so as to cover an area between a floor tunnel provided in the center in the widthwise direction of the automobile body and a side sill provided in a side portion of the automobile body, and the vertical faces are formed by a side wall face of the floor tunnel and the side sill.

With this configuration, it is possible to raise or lower the floor board while maintaining a small value for the space between both ends of the floor board provided between the side sill and the floor tunnel and the automobile body floor mat provided laid out along the side walls of the side sill and the floor tunnel. Also, the floor board can be provided so as to cover approximately the entire area in the widthwise direction between the side sill and the floor tunnel, so it is possible to insure a larger placement face on which the occupant's feet are placed.

This application is based on 5 (five) Japanese patent Application Ser. Nos. 2006-26054, 2006-27516, 2006-27517, 2006-27518, and 2006-37015, filed in Japan Patent Office, on February 02, February 03, February 03, February 03, and Feb. 14, 2006, respectively, and the contents of all of which are hereby incorporated by reference.

Although the present invention has been described in terms of specific exemplary embodiments, it will be appreciated that various changes and modifications may be made by those skilled in the art without departing from the spirit and scope of the invention, defined in the following claims.

What is claimed is:

1. An automobile movable floor apparatus comprising:
   a floor board that covers the upper face of an automobile body floor;
   a raising-lowering drive mechanism that raises or lowers the floor board, provided in the foot area of an occupant seated in an occupant seat;
   a toe board portion of the automobile body floor sloping down to the rear; and
   a floor base portion of the automobile body floor that extends toward the rear of the automobile body and is continuous with the rear end of the toe board portion, provided in the automobile body floor;
   the floor board including:
   a toe board corresponding portion that corresponds to the toe board portion of the automobile body floor, and
   a floor base corresponding portion that corresponds to the floor base portion, and where the toe board corresponding portion and the floor base corresponding portion being formed in a flattened V-like shape when viewed from the side;
   wherein the front end of the toe board corresponding portion of the floor board is pivotably attached to the toe board portion of the automobile body floor, and the raising-lowering drive mechanism is configured so as to lift the rear of the floor base corresponding portion upward to place the floor base corresponding portion in a state sloping downward to the front.

2. The automobile movable floor apparatus according to claim 1, wherein the floor board comprising a front side board including the toe board corresponding portion and the floor base corresponding portion, and a rear side board bendably connected to the rear end of the front side board via a connecting member, wherein the rear of the rear side board is supported such that the rear of the rear side board can slide in the front-rear direction of the automobile body along the floor base portion of the automobile body floor.

3. The automobile movable floor apparatus according to claim 1, wherein: operating pedals operated by a driver, constituting at least an accelerator pedal and a brake pedal are provided above the toe board portion of the automobile body floor; and a foot rest is provided to the side of those operating pedals;
   wherein the front of the floor board extends out below the operating pedals; and
   an avoiding portion that avoids obstructing the foot rest is provided in a side portion of the floor board.

4. The automobile movable floor apparatus according to claim 1, wherein a rear heat duct is provided in the automobile body floor that extends toward the rear of the automobile body from a side of a floor tunnel through an area below the floor board, and a cut-out is formed in a side portion of the floor board in order to a avoid interference with the rear heat duct.

5. The automobile movable floor apparatus according to claim 1, wherein the raising-lowering drive mechanism comprising a drive link whose tip end is connected to the rear of the floor base corresponding portion, and a link drive mechanism that, by moving the base end of the drive link forward or to the rear along the automobile body floor, erects or lays down the drive link to drive the floor board up or down.

6. The automobile movable floor apparatus according to claim 5, wherein a left and right pair of the drive links and the link drive mechanisms are provided, and driving force is transmitted to each of the link drive mechanisms via a driving force transmission mechanism from a single drive source.

7. The automobile movable floor apparatus according to claim 1, wherein raising-lowering drive mechanism is disposed below the floor board, and an impact-absorbing member is provided on the upper face of the floor board.

8. The automobile movable floor apparatus according to claim 7, wherein the impact-absorbing member is disposed on the floor board across approximately the entire width of the automobile.

9. The automobile movable floor apparatus according to claim 8, wherein a concave portion concave downward is formed in the front portion of the floor board, and the impact-absorbing member is disposed in the concave portion.

10. The automobile movable floor apparatus according to claim 1, further comprising:
an automobile body floor mat provided laid out on the automobile body floor and covering the upper face thereof; and
a floor board mat, separate from the automobile body floor mat, provided laid out on the floor board.

11. The automobile floor apparatus according to claim 10, wherein the automobile body floor mat covers the upper face of the automobile body floor, including a first area located below the floor board, and the automobile body floor mat is provided laid out so as to continuously cover the first area and a second area.

12. The automobile floor apparatus according to claim 10, wherein the floor board is driven up or down in approximately the vertical direction when viewed from the front, and the automobile body floor mat is provided laid out along vertical faces and provided so as to extend in approximately the vertical direction adjacent to both ends of the floor board in the widthwise direction of the automobile.

13. The automobile floor apparatus according to claim 12, wherein the floor board is provided so as to cover an area between a floor tunnel provided in the center in the widthwise direction of the automobile body and a side sill provided in a side portion of the automobile body, and
the vertical faces and are formed by a side wall face of the floor tunnel and the side sill.

14. An automobile movable floor apparatus comprising:
a floor board that covers the upper face of an automobile body floor;
a raising-lowering drive mechanism that raises or lowers the floor board, provided in the foot area of an occupant seated in an occupant seat;
a toe board portion of the automobile body floor sloping down to the rear; and
a floor base portion of the automobile body floor that extends toward the rear of the automobile body and is continuous with the rear end of the toe board portion, provided in the automobile body floor;
a seat position adjustment mechanism that drives a seat cushion of the occupant seat in at least the front-rear direction; and
a driving force transmission mechanism that transmits the driving force of the seat position adjustment mechanism to the raising-lowering drive mechanism;
the floor board including:
a toe board corresponding portion that corresponds to the toe board portion of the automobile body floor, and
a floor base corresponding portion that corresponds to the floor base portion, and where the toe board corresponding portion and the floor base corresponding portion being formed in a flattened V-like shape when viewed from the side;
wherein the floor board is driven up or down by the raising-lowering drive mechanism in conjunction with the occupant seat driven in the front-rear direction by the seat position adjustment mechanism; and
wherein the driving force transmission mechanism comprises:
an input cable that obtains driving force from the drive source provided in the seat position adjustment mechanism and rotates around a shaft;
an output cable that rotates around a shaft according to the rotation of the input cable, thus transmitting driving force to the raising-lowering drive mechanism; and
a gear box in which the input cable and the output cable are connected such that the input cable and the output cable are operable in conjunction with each other.

15. The automobile movable floor apparatus according to claim 14, wherein the gear box of the driving force transmission mechanism comprising:
a deceleration gear mechanism that reduces the rotational velocity of the input cable; and
a transmission gear mechanism that transmits the driving force after deceleration to the output cable.

16. The automobile movable floor apparatus according to claim 14, wherein the gear box of the driving force transmission mechanism is provided protruding from the upper face of the automobile body floor, and is fixed to a cross member that supports the front end of the occupant seat or fixed to the automobile body floor in the vicinity thereof.

* * * * *